United States Patent
Kistler et al.

(10) Patent No.: US 7,559,509 B1
(45) Date of Patent: Jul. 14, 2009

(54) LARGE CRYOGENIC TANK LOGISTICS FOR IN-SPACE VEHICLES

(75) Inventors: Walter P. Kistler, Redmond, WA (US);
Thomas C. Taylor, 3705 Canyon Ridge Arc, Las Cruces, NM (US) 88011;
Robert A. Citron, Bellevue, WA (US)

(73) Assignee: Thomas C. Taylor, Las Cruces, NM (US)

( * ) Notice: Subject to any disclaimer, the term of this patent is extended or adjusted under 35 U.S.C. 154(b) by 0 days.

(21) Appl. No.: 11/767,459

(22) Filed: Jun. 22, 2007

Related U.S. Application Data

(60) Provisional application No. 60/889,328, filed on Feb. 12, 2007.

(51) Int. Cl.
*B64G 1/00* (2006.01)
*B64G 1/64* (2006.01)

(52) U.S. Cl. .................. 244/172.3; 244/172.4

(58) Field of Classification Search .......... 244/172.2, 244/172.3, 135 A, 135 R
See application file for complete search history.

(56) References Cited

U.S. PATENT DOCUMENTS

| | | | | |
|---|---|---|---|---|
| 3,304,724 A | * | 2/1967 | Blumrich et al. | 60/257 |
| 3,537,669 A | * | 11/1970 | Modesti | 244/23 C |
| 3,934,512 A | * | 1/1976 | Adachi | 102/377 |
| 4,741,502 A | * | 5/1988 | Rosen | 244/158.9 |
| 4,817,855 A | * | 4/1989 | Bunkoczy | 228/171 |
| 5,305,970 A | * | 4/1994 | Porter et al. | 244/172.2 |
| 5,429,328 A | * | 7/1995 | Dobbs et al. | 244/172.5 |
| 6,123,295 A | * | 9/2000 | Wexler et al. | 244/172.3 |
| 6,322,023 B1 | * | 11/2001 | Soranno et al. | 244/159.4 |
| 6,422,514 B1 | * | 7/2002 | Clark et al. | 244/135 R |
| 6,620,519 B2 | * | 9/2003 | Modi | 428/450 |
| 6,968,704 B2 | * | 11/2005 | Hood | 62/46.1 |
| 7,070,151 B2 | * | 7/2006 | D'Ausilio et al. | 244/171.1 |
| 7,114,682 B1 | * | 10/2006 | Kistler et al. | 244/172.2 |
| 7,395,832 B2 | * | 7/2008 | Behruzi et al. | 137/154 |
| 2007/0051854 A1 | * | 3/2007 | Behrens et al. | 244/172.3 |

* cited by examiner

*Primary Examiner*—Michael R Mansen
*Assistant Examiner*—Joseph W Sanderson
(74) *Attorney, Agent, or Firm*—Alan Lenkin; F & J LLP

(57) ABSTRACT

An aerospace frame accommodates propellant tanks for facilitating propellant operations in space. The frame includes at least two plates for supporting the propellant tanks; at least one brace supporting the plates; and a cavity between two plates that accommodates a removable propellant tank.

16 Claims, 16 Drawing Sheets

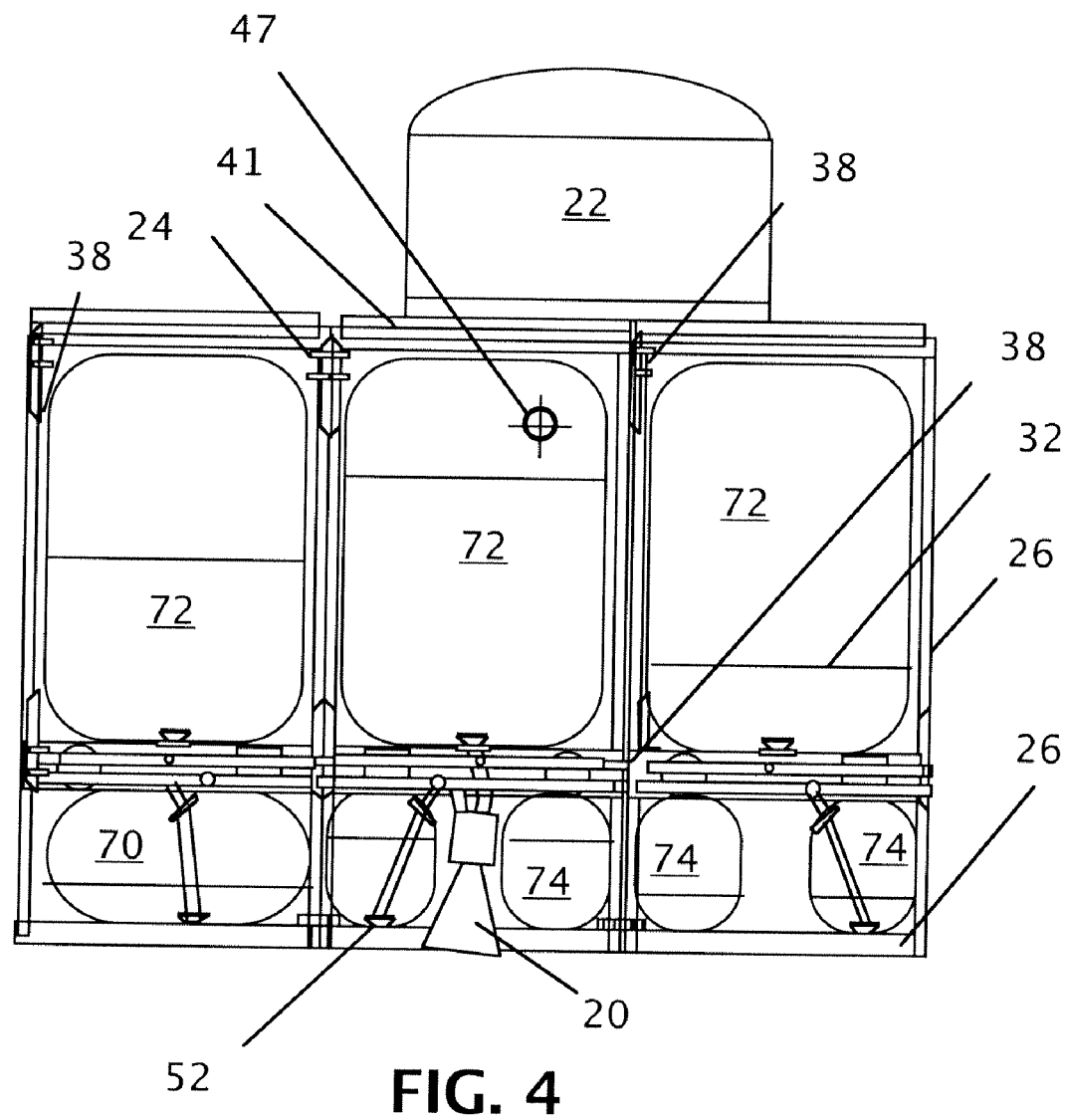
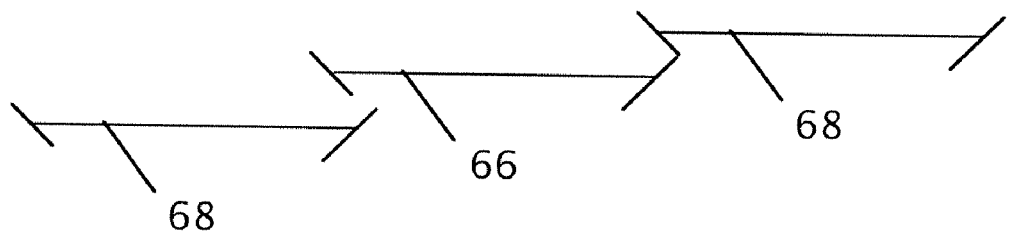
FIG. 4

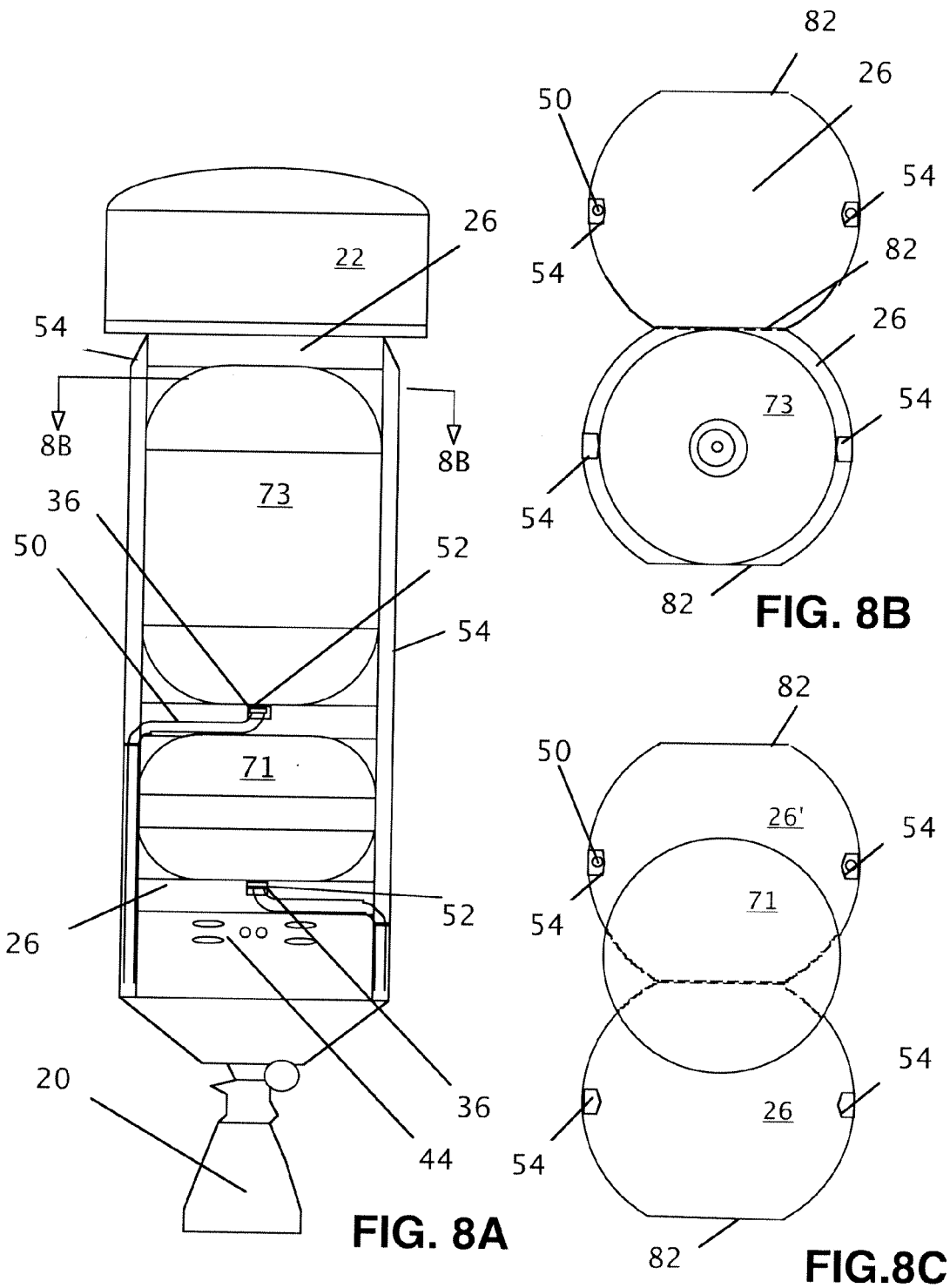

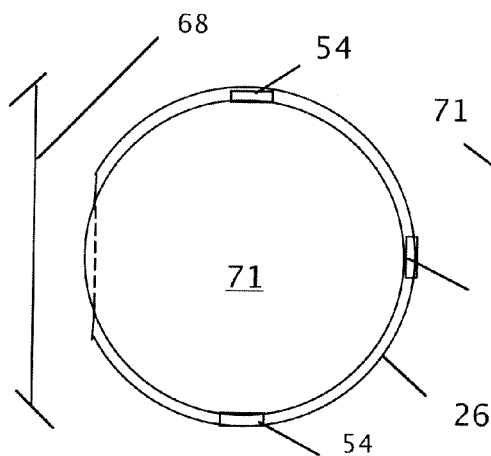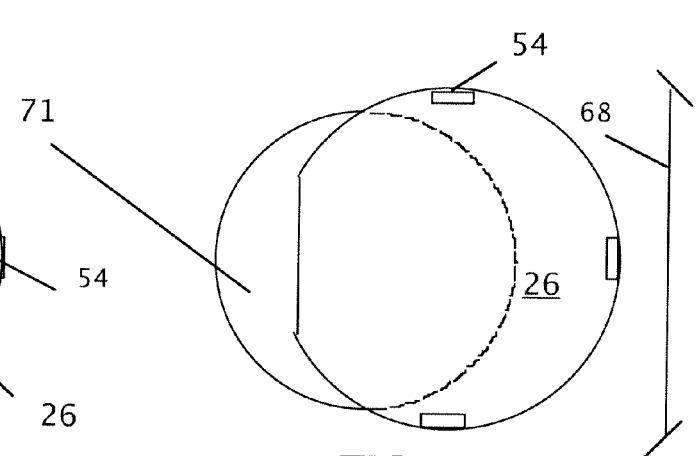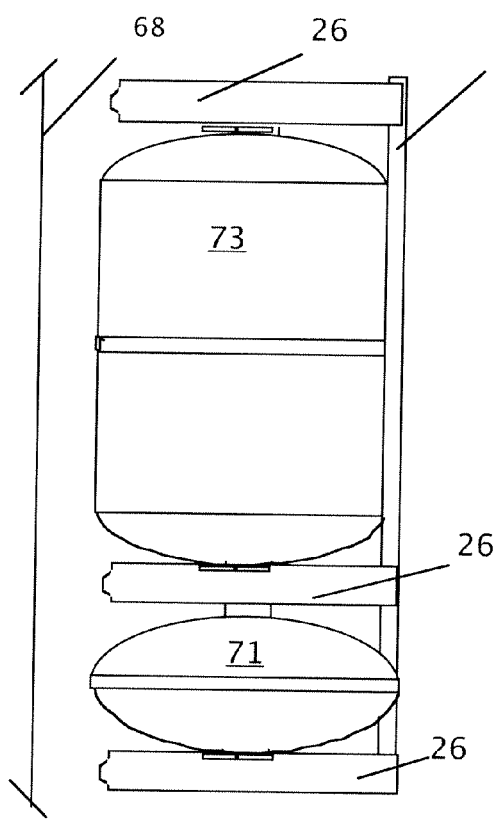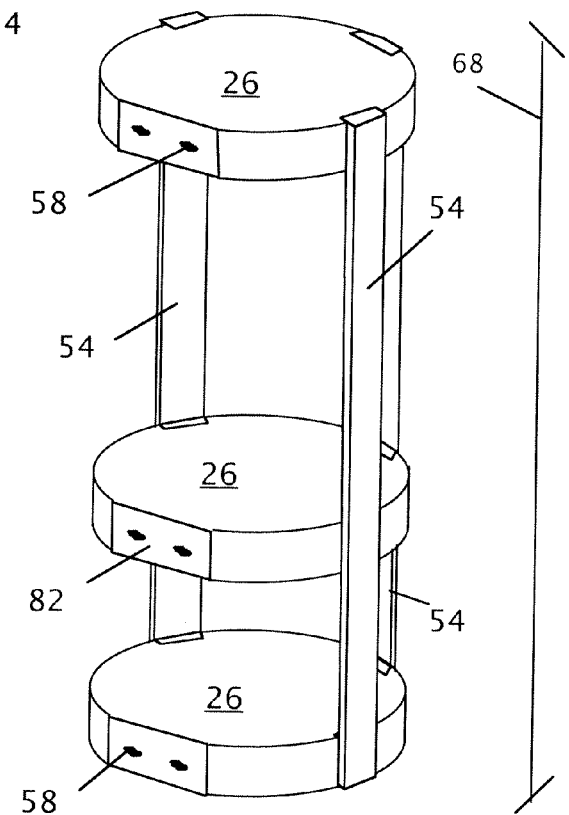
FIG. 10B
FIG. 10C
FIG. 10A
FIG. 10D

US 7,559,509 B1

LARGE CRYOGENIC TANK LOGISTICS FOR IN-SPACE VEHICLES

CROSS REFERENCE TO RELATED APPLICATIONS

This application claims the benefit of U.S. Provisional Patent Application No. 60/889,328, entitled "Large Cryogenic Tank Logistics for In-Space Vehicles," filed on 12 Feb. 2007, the disclosure of which is expressly incorporated herein by reference in its entirety.

This application claims the benefit of U.S. Patent Office Disclosure Document Program, Ser No. 611253, entitled "DD#4 Walter's add to Big Tanks," filed on 22 Jan. 2007, the disclosure of which is expressly incorporated herein by reference in its entirety.

This application claims the benefit of U.S. Patent Office Disclosure Document Program, Ser. No. 605267, entitled "P7 Big Tank Ideas," filed on 28 Aug. 2006, the disclosure of which is expressly incorporated herein by reference in its entirety.

This application claims the benefit of U.S. Patent Office Disclosure Document Program, Ser. No. 596186 entitled "Lunar Transportation Propellant Depot Architecture and Vehicle 1," filed on 9 Mar. 2006, the disclosure of which is expressly incorporated herein by reference in its entirety.

This application claims the benefit of U.S. Patent Office Disclosure Document Program, Ser. No. 558819, entitled "Propellant Transfer between Rocket Vehicles in Space," filed on 10 Aug. 2004, the disclosure of which is expressly incorporated herein by reference in its entirety.

This application claims the benefit of U.S. Patent Office Disclosure Document Program, Ser. No. 605268, entitled "Lunar Surface Exploration," filed on 28 Aug. 2006, the disclosure of which is expressly incorporated herein by reference in its entirety.

This application claims the benefit of U.S. Patent Office Disclosure Document Program, Ser. No. 605286, entitled "Salvage NASA CEV & Space Exploration Hardware," filed on 28 Aug. 2006, the disclosure of which is expressly incorporated herein by reference in its entirety.

This application claims the benefit of U.S. Patent Office Disclosure Document Program, Ser. No. 595143, entitled "Larger Tanks Lonnie DD # 1," filed on 16 Feb. 2006, the disclosure of which is expressly incorporated herein by reference in its entirety.

NO GOVERNMENT RIGHTS

No government funding, no government support or government contract or clause is related to this concept.

COPYRIGHTED MATERIAL

A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

FIELD OF THE INVENTION

The present invention relates to aerospace. More specifically, the present invention relates to large cryogenic propellant tanks that can be transferred between in-space vehicles.

BACKGROUND

Travel to space is exorbitantly expensive. It would be beneficial to significantly reduce the costs associated with space travel.

The trip of 200 miles and twenty minutes from Earth to orbit takes 70% to 80% of the propellant needed to go to the moon and most other locations in our near universe. Over 90% of the weight of Earth to orbit (ETO) vehicles is currently propellant and each pound of the useful payload costs about $10,000 per pound to transport to orbit. Thus, any of the original vehicle that can be reused returns about $10,000 per pound for every pound reused on every reuse mission. Reusing vehicle hardware in space many times provides a significant return on the original investment. The present invention provides innovation to efficiently use the same Earth to orbit launch vehicle payload diameter for both the initial launch and later launches.

Reusable launch vehicles are starting to emerge off the drawing boards for the transportation from Earth to orbit, but little effort is dedicated to reusable vehicles for transport beyond Earth orbit. The present invention pertains to reusable vehicles used beyond Earth orbit and the propellant necessary for those vehicles beyond Earth orbit. Transferring propellant tanks is one of several methods to potentially reduce the complexity and cost of in-space transportation vehicles and their logistics support systems.

Space transportation vehicles typically have fixed payload diameter requirements. Maximizing use of the fixed payload diameter is one means to get the most value out of the costs associated with a launch.

Reusable in-space transportation vehicles are initially transported to Earth orbit as payloads on vehicles launched from the Earth surface to low Earth orbit (LEO). Once in space, they operate as in-space vehicles, traveling from Earth orbit to destinations beyond. When being transported as payload to orbit, the propellant tanks for the in-space vehicle must share the payload diameter with the vehicle itself. Accordingly, small tanks are launched into orbit with the in-space vehicles.

It would be desirable to use the same Earth to low Earth orbit launch vehicle payload diameter for both the reusable vehicle loaded with propellant and the next series of resupply propellant tanks. Larger tanks (without an in-space vehicle) could be launched in subsequent missions to use the full diameter of the Earth to orbit delivery vehicle.

A problem is the initial propellant tanks would be about one third the diameter of the later resupply tanks. However, both size tanks must fit within the same reusable vehicles in orbit.

It would be desirable to build a commercial relationship with an Earth to Orbit (ETO) vehicle transportation supplier by using their vehicles many times to maximize the effect of the reusable vehicle economies.

The payload diameters, tankage weight and the unmanned transfer process are critical to the cost effectiveness of a logistics system beyond Earth orbit. The present invention provides solutions in a commercial business environment, where excessive cost creates a barrier to further development and logistics support of operations on celestial bodies beyond Earth.

SUMMARY

A primary object of the present invention is to increase affordability by solving the diameter problem caused by using the same commercial delivery vehicles from Earth to low Earth orbit.

A primary advantage of the present invention is the ability to use different diameter tanks and increase affordability by using the same payload diameter on the first leg of trips beyond Earth orbit.

A primary object is to avoid transfer of tanks and propellant, and to instead join entire vehicles to transfer or share thrust.

Another primary object is to manage the resupply of propellant, which is 70 to 90% of all mission mass beyond Earth.

In one aspect of the present invention, an aerospace frame accommodates propellant tanks for facilitating propellant operations in space. The frame includes at least two plates for supporting the propellant tanks; at least one brace supporting the plates; and a cavity between two plates that accommodates a removable propellant tank.

In another aspect, a method is provided for re-fueling an in-space rocket unit. The method includes rendezvousing and docking with the rocket unit; removing a spent propellant tank; and inserting a new propellant tank into a frame of the rocket unit.

In yet another aspect, a method is provided for launching an in-space vehicle and subsequently re-supplying the in-space vehicle. The method includes initially launching the in-space vehicle, loaded with smaller propellant tanks, as payload of an Earth to orbit launch vehicle; and subsequently launching larger propellant tanks as payload of the Earth to orbit launch vehicle. The in-space vehicle and the larger propellant tanks have the same diameter as a payload diameter of an Earth to orbit launch vehicle payload section.

An aerospace propellant system includes at least two rocket units coupled together. Each rocket unit has a frame that accommodates propellant tanks, the frame having at least two plates for supporting the propellant tanks, at least one brace supporting the plates, a cavity between two plates that accommodates a removable propellant tank, at least one engine, and a payload support system. The payload support system enables adjustment of a payload position to change a center of gravity of the coupled together rocket units to keep the center of gravity within a velocity vector of the coupled together rocket units.

In still another aspect, an aerospace frame accommodates propellant tanks for facilitating propellant operations in space. The frame includes at least two plates for supporting the propellant tanks; at least one central brace supporting the plates; and a cavity between two plates that accommodates a plurality of smaller removable propellant tanks. The frame also includes a detachable tank support that facilitates storage of larger propellant tanks, the detachable tank support connecting to the frame and including a transfer slot.

Other objects, advantages and novel features, and further scope of applicability of the present invention will be set forth in part in the detailed description to follow, taken in conjunction with the accompanying drawing figures, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating embodiments of the invention and are not to be construed as limiting the invention. In the drawings:

FIG. 4 is side schematic view of three coupled "all in one" rocket units, according to an aspect of the present invention;

FIGS. 8A, 8B, and 8C are side and end views of slip-through rocket units, including a payload transfer, according to an aspect of the present invention;

FIGS. 10A, 10B, 10C, and 10D show side, perspective, and end views of a slip in unit, according to an aspect of the present invention;

FIGS. 15A, 15B and 15C are side views showing details of the slide block and belt transfer device operations, according to an aspect of the present invention; and.

DETAILED DESCRIPTION

Figure 1A:
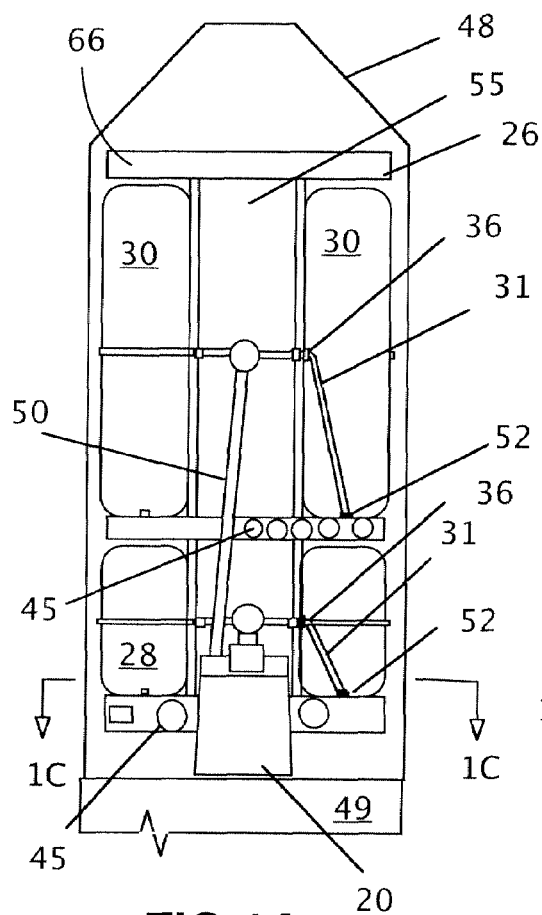
FIGS. 1A, B, C, and D are side schematic and top section views showing propellant tanks within a delivery vehicle, according to an aspect of the present invention.

Previously, six small tanks were positioned in a circular fashion to provide the propellant to evolve a commercial affordable logistics transportation system to and from the moon. The present invention presents a larger tank approach and includes a commercial private investment approach that uses the same Earth to orbit (ETO) launch vehicle payload diameter as a parameter in a commercial partnership relationship with a vehicle supplier having a specific payload diameter to sell, whether it is government, commercial space or other transportation supplier. An initial basic frame vehicle with small tanks is launched and later the same basic vehicle is re-supplied in Earth orbit with larger tanks. Both the early and later resupply payloads have the same diameter. This makes the resupply tanks approximately three times the small tank diameter and increases the propellant available to the same orbital in-space vehicle by about 13 times. The large tanks allow the transportation system to grow as the commercial market grows and better serve its customers with an anticipated decline in the cost of transportation over time.

Using the same ETO vehicle supplier has a number of advantages for both sides. Advantages include common hardware and bulk pricing for multiple vehicle buys, as well as the ability to optimize the suppliers' production line and remove the start and stop aspect of the supplier's production line.

According to an aspect of the invention, transport of propellant mass to Earth orbit takes advantage of a specific payload diameter and overall payload mass capability of an Earth to orbit delivery vehicle. If an affordable commercial Earth to orbit vehicle is chosen as the transportation system, then the present invention enables the same initial delivery vehicle payload diameter to be used for both the initial launch of the in-space reusable vehicle and the later support of that same in-space vehicle with larger tanks that use the same payload diameter.

A key to economy is a long-term contract with a delivery vehicle organization allowing them to transport with a reusable vehicle having a fixed diameter and special payload accommodations. The present invention provides several methods permitting the same commercial delivery vehicle to cost effectively supply both the initial launch and subsequent larger tanks used for later missions of the in-space vehicles beyond Earth orbit. Cost effectiveness and commercial partnering are critical in creating a commercial in-space logistics transportation system capable of raising private capital required to enhance the stressed space agency budgets around the world.

A primary object of the present invention is to use the same Earth to orbit delivery vehicle diameter and payload to transport the initial in-space vehicle and the later more frequent propellant filled tankage. Using the same vehicle allows the commercial in-space operation to use or partner with a single Earth to orbit transportation company and create or extend this partnership from Earth surface all the way to and from the moon. This creates, for example, a reusable in-space commercial end-to-end logistics system for both directions to effectively control cost, optimize the flow of non-essential materials and to plan for future operations of cargo mass traveling smoothly in both directions.

Primary advantages of the present invention are cost reduction, increased early market and growth upgrades within a single business unit to allow for the effective control of operations and cost growth.

Figure 1B:
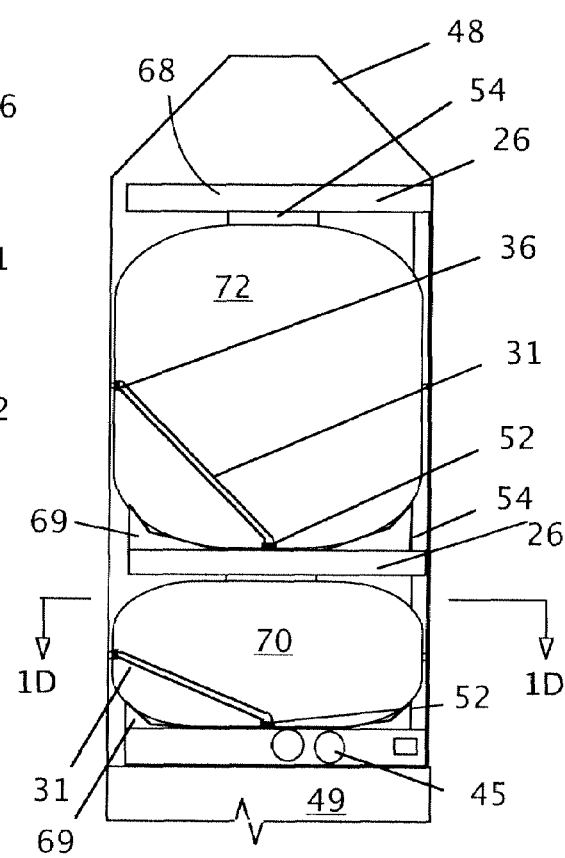
Figure 1C:
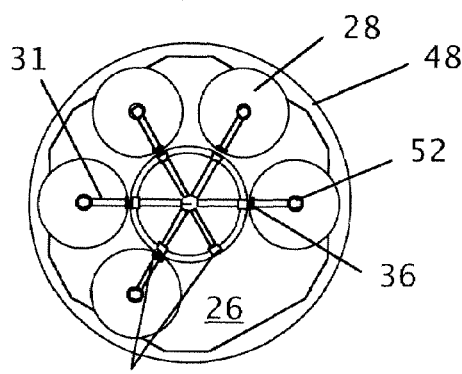

Reference is now made to FIGS. 1A-1D, which illustrate embodiments of the invention. FIGS. 1A and 1C depict the initial delivery of the in-space vehicle 66 with tanks 28, 30 having smaller diameters. The in-space vehicle 66 includes a basic frame 26 and a rocket engine 20, as well as other components that will be discussed later. The payload is delivered by an ETO launch delivery vehicle 49, a small uppermost portion of which is shown. A payload envelope 48 encapsulates the vehicle 66 loaded with tanks 28, 30. As seen best in FIG. 1C, which is a cross section viewed from the line 1C-1C, the smaller diameter tanks 28 (as well as the tanks 30) are arranged in a circular manner around central brace 55. Central brace 55 holds basic frame 26 apart and stable under payload launch and later during in-space use.

Figure 1D:
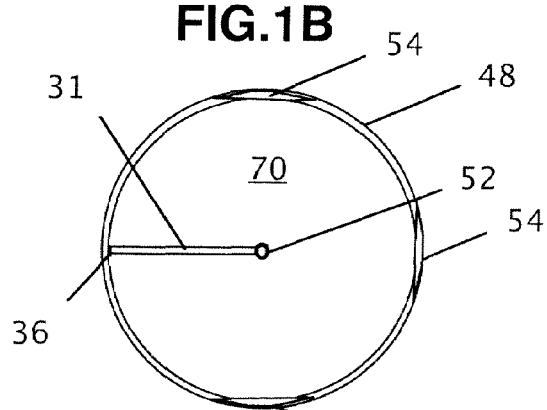

In FIGS. 1B and 1D, later missions are shown in which larger diameter tanks 70, 72 are delivered in a basic frame 26. Hydrogen tank 72 within basic frame 26 is capable of using the full diameter of ETO delivery vehicle payload envelope 48. Basic frame 26 without an engine and associated components will be referred to as a propellant unit 68. Basic frame 26 includes side braces 54 in the embodiment shown in FIGS. 1B and 1D. Three side braces 54 are shown on each frame 26 in FIG. 1D, which is a section view along line 1D-1D. In FIG. 1B, only two of the side braces 54 are actually seen. Side braces 54 hold basic frame plates apart and stable during launch from Earth and later during in-space use of the frame 26.

As seen in FIGS. 1A-1D, valves 36 are provided. An exemplary valve is the flat valve described in U.S. patent application Ser. No. 11/412,786 filed on Apr. 28, 2006, in the names of H. Stephen Jones et al. FIGS. 1A-1B are section schematic views permitting viewing of the inside of the tanks, and thus the flat valves 36. In FIG. 1A, the right most tanks 28, 30 are shown in section view to permit viewing of the inside of those tanks. Thus, only the rightmost tanks 28, 30 in FIG. 1A show the internal flat valves 36 and other internal tank components. The other tank components include siphon lines 31 and anti-vortex devices 52. The anti-vortex device 52 ensures no air is fed into the siphon line 31, when flowing propellant, due to microgravity and the natural vortex that is sometimes created. Gaseous RCS thruster propellant storage 45 is also provided.

In the case of in-space vehicle 66 of FIGS. 1A and 1C, a flat valve 36 is provided on the central brace 55 for connecting to the flat valve 36 in each tank wall. Once the valves 36 are connected, propellant flows into feed lines 50 located within central brace 55. The propellant feed lines 50 supply rocket engine 20 with propellant.

A tank, designed for many years of light non-gravity use in the relatively light loading required in the microgravity of space, is typically penalized by extra mass required for the eight minutes of initial use. In another aspect of the present invention, launch stabilization cradles 69 are provided in the ETO delivery launch vehicle 49 to eliminate this penalty. The launch stabilization cradles help resist the 3 gravity loads of the initial launch.

In one embodiment, launch stabilization cradle 69 in ETO delivery launch vehicle 49 is expanded to include a cryogenic propellant temperature protection system, having both active and passive mini-cryogenic coolers, power for these cooler operations on the pad, during the launch and in space until delivery is made, and a re-circulation system for recirculating the cryogenic liquids stored on board as the vehicle sits on the pad. The re-circulation is similar to the cryogenic recirculation used for reusable ETO delivery launch vehicle 49. Preferably, the launch stabilization cradle 69 in the ETO launch delivery vehicle 49 can be salvaged, except those required for the safe return of ETO delivery launch vehicle 49 to Earth.

The concept is: smaller liquid oxygen tank 28 and liquid hydrogen tank 30 are designed to resist the full launch loads from ETO launch as the tanks are positioned in basic frame 26. In contrast, the larger liquid oxygen tank 70 and larger liquid hydrogen tank 72 can be positioned within launch stabilization cradles 69 in the ETO vehicle. The cradles 69, provides some of the structural strength and thermal protection required for an estimated 3 gravity ETO launch. This extra strength and thermal protection are generally not required for the journey from Earth orbit to lunar orbit and/or the moon's surface.

In one embodiment, the launch stabilization cradle 69 is designed for a specific ETO launch vehicle bolt-on payload nose and used many times on this same reusable vehicle. Thus, it becomes economical to build a special nose for each type of larger liquid oxygen tank 70 and larger liquid hydrogen tank 72, in part, because this cost is spread over many uses. This payload may also be a manifest filler and further reduce cost by being in a stand-by mode. The launch stabilization cradles 69 provide further cost reduction partly because tanks can be lighter, because they only need to resist in-space loads. In another embodiment, launch stabilization cradles 69 either stay with the tank or the frame or they are split between the two for ease of transfer. In yet another embodiment, launch stabilization cradle 69 is disposable.

Figure 2A:
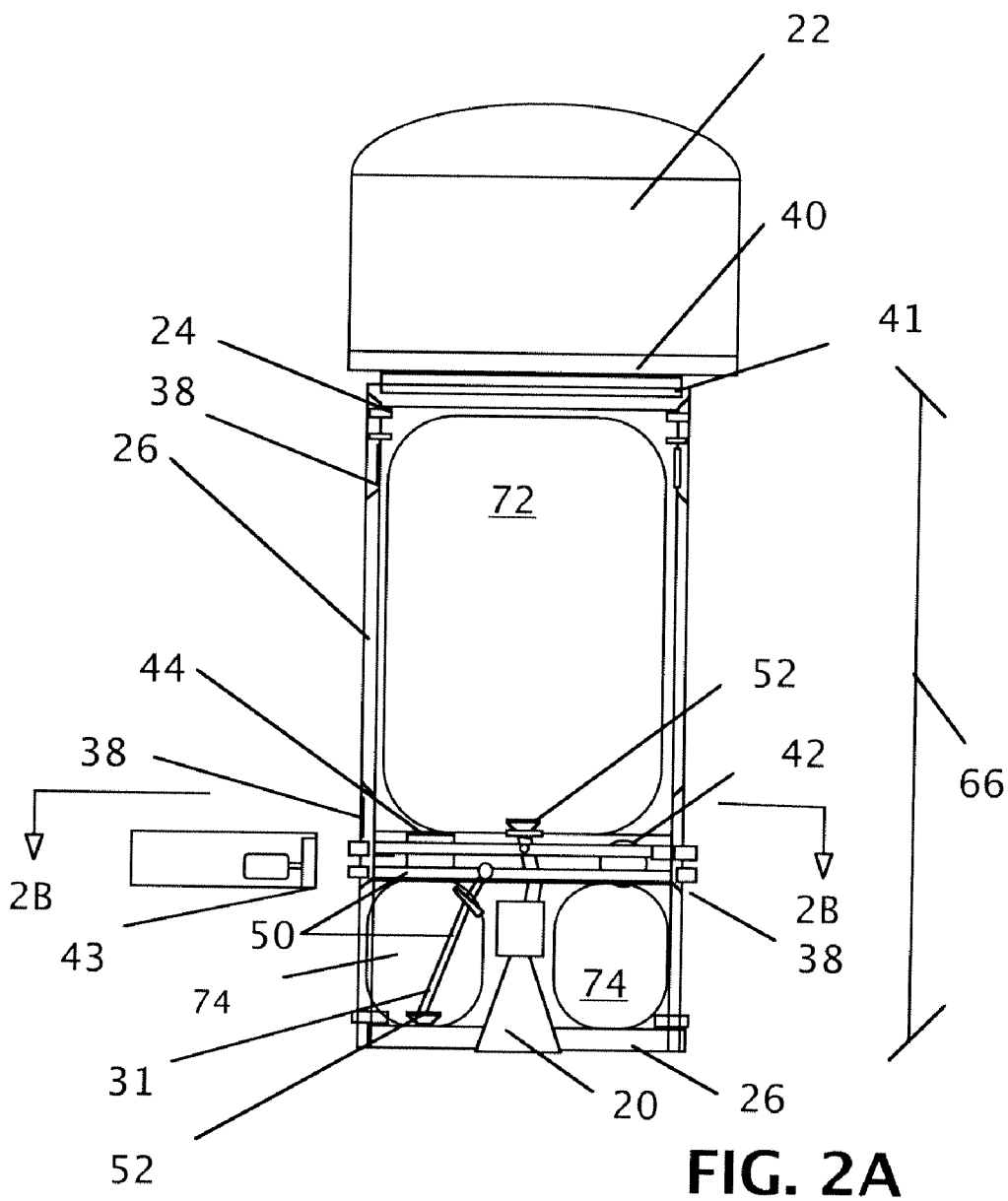
FIGS. 2A and 2B are side schematic and top section views of an embodiment of an "all in one" rocket unit, according to an aspect of the present invention.
Figure 2B:
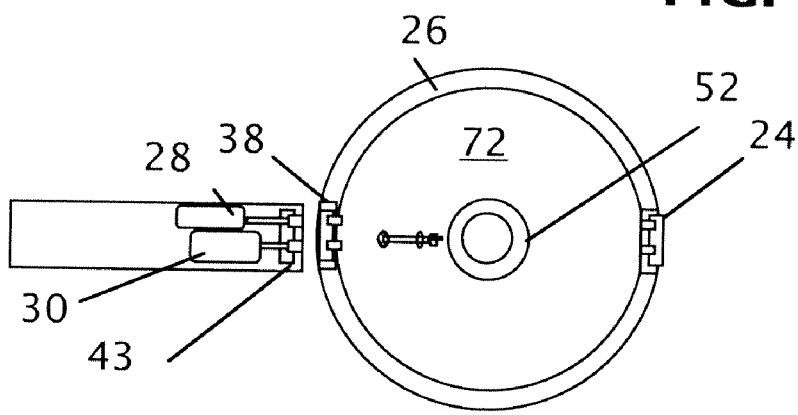

Reference is now made to FIG. 2A showing a side schematic view and FIG. 2B showing a top section view along line 2B-2B of an "all-in-one" rocket unit 66 and a launch pad propellant support system 43.

The "all in one" rocket unit 66 comprises basic frame 26, engine 20, built in liquid hydrogen tank 72, built in torus shaped liquid oxygen tank 74 and other components. Reaction control thrusters and vehicle subsystem 44 are placed between plates of the frame 26. The all-in-one rocket unit 66 is an assembly that is built to work as a single unit or in cooperation with other rocket units 66 and/or propellant units 68 (see FIGS. 3 and 4) when joined with vehicle connectors 38. Although not explicitly shown, male and female versions of the vehicle connectors 38 are provided to enable the coupling.

Cryogenic liquid coupling 24 within vehicle connector 38 permits the joining and transfer of liquids between different units 66. For example, propellant pressurant tank 42 contents can be transferred to another unit 66 decreasing propellant level to change the center of gravity. Vehicle connector 38 with cryogenic liquid coupling 24 provides for at least two connection points with nearby similar rocket units 66, providing structural connections capable of withstanding significant rocket propulsion forces, and the ability to transfer cryogenic liquid such as RCS consumables and pressurant gasses. The connectors also permit transfer of command and control signals, and structural latching and de-coupling signals. Thus, the connectors 38 provide structural, liquid, electrical, control and video connections. Connectors 38 can also enable rendezvous and berthing using vertical units capable of magnetic attraction.

A payload 22 is shown on a payload pallet 40 cooperating with an embedded beam 41, as described in U.S. Pat. No. 7,118,077 to KISTLER et al., issued Oct. 10, 2006, the disclosure of which is expressly incorporated by reference herein in its entirety.

In FIG. 2B the launch pad propellant support system 43 is shown connected to the rocket unit 66 via the connectors 38. In one embodiment, the connectors 38 permit re-circulation of the cryogenic propellants when the rocket unit is on the launch pad. Thus, refilling and draining of the tank 72 can be eliminated. In addition, boil-off on the launch pad is reduced. Although FIG. 2B only shows interconnection with the liquid hydrogen tank 72, connections can also be made with the liquid oxygen tank 74.

Figure 3:
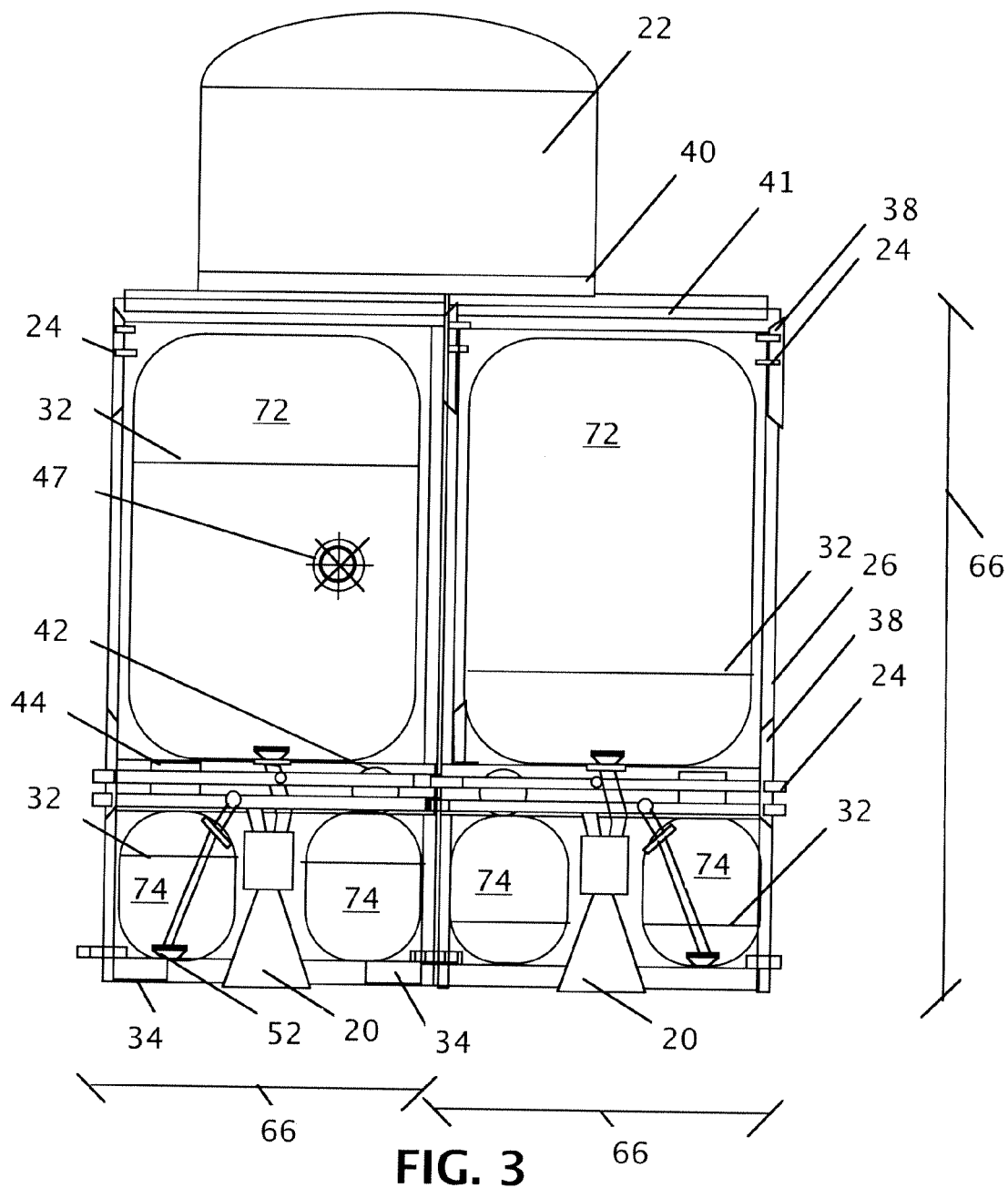
FIG. 3 is side schematic view of two coupled "all in one" rocket units, according to an aspect of the present invention.

Reference is made to FIG. 3 showing a side section view of two coupled together "all in one" rocket units 66. The two rocket units 66 have the ability to operate in unison and/or transfer propellant and thrust between rocket units 66 via vehicle connector 38 and cryogenic liquid coupling 24. Rocket units 66 contain torus liquid oxygen tanks 74 and larger liquid hydrogen tanks 72. Once one rocket unit 66 is depleted of propellant it is separated at a convenient location for refilling and any other required servicing. That is, vehicle connectors 38 are capable of detaching one or more rocket units 66 at times consistent with increased economy.

When operating together, rocket units 66 can adjust the position of payload 22 using payload pallet 40 and embedded beam 41. Payload masses 22 are moved to keep the vehicle center of gravity 47 within the velocity vector of rocket engine 20. For example, as the propellant is used from torus liquid oxygen tank 74 and larger liquid hydrogen tank 72 in one of the rocket units 66, the center of gravity 47 shifts. Embedded beam 41 and payload pallet 40 attached to basic frame 26 permit movement of payload 22 to effectively use rocket engine 20 of each rocket unit 66 with different propellant levels 32. Payload 22 masses are shifted by on-board sensors and/or remote telecommunications via embedded beam 41. Propellant pressurant tank 42 is located in basic frame 26. Propellant level 32 can be adjusted to a point that permits sufficient propellant to disengage and return to a refueling location.

Anti-vortex device 52 prevents air from being sucked into the rocket engine 20. Folded up landing legs 34 are shown under the vehicle rocket unit 66. Vehicle subsystems 44 are located between the tanks 72, 74. Even when attached to another rocket unit, the legs can be extended, permitting removal of the tanks (of course not torroidal tank 74). Vehicle subsystems 44 are located between the tanks 72, 74.

FIG. 4 is a schematic side section view showing an "all in one" rocket unit 66 coupled with two propellant units 68. The coupled units have the ability to operate in unison and/or transfer propellant from propellant units 68 via vehicle connector 38 and cryogenic liquid coupling 24. Payload masses 22 are moved to keep the coupled vehicle's center of gravity 47 within the velocity vector of the engine 20. The leftmost propellant unit 68 is shown without torus liquid oxygen tank 74, but with larger liquid oxygen tank 70. The propellant units 68 replace the relatively more expensive rocket unit 66 having a rocket engine 20. Larger liquid hydrogen tank 72 is removable and adjust its propellant level 32 with cryogenic liquid coupling 24 within basic frame 26.

Figure 5:
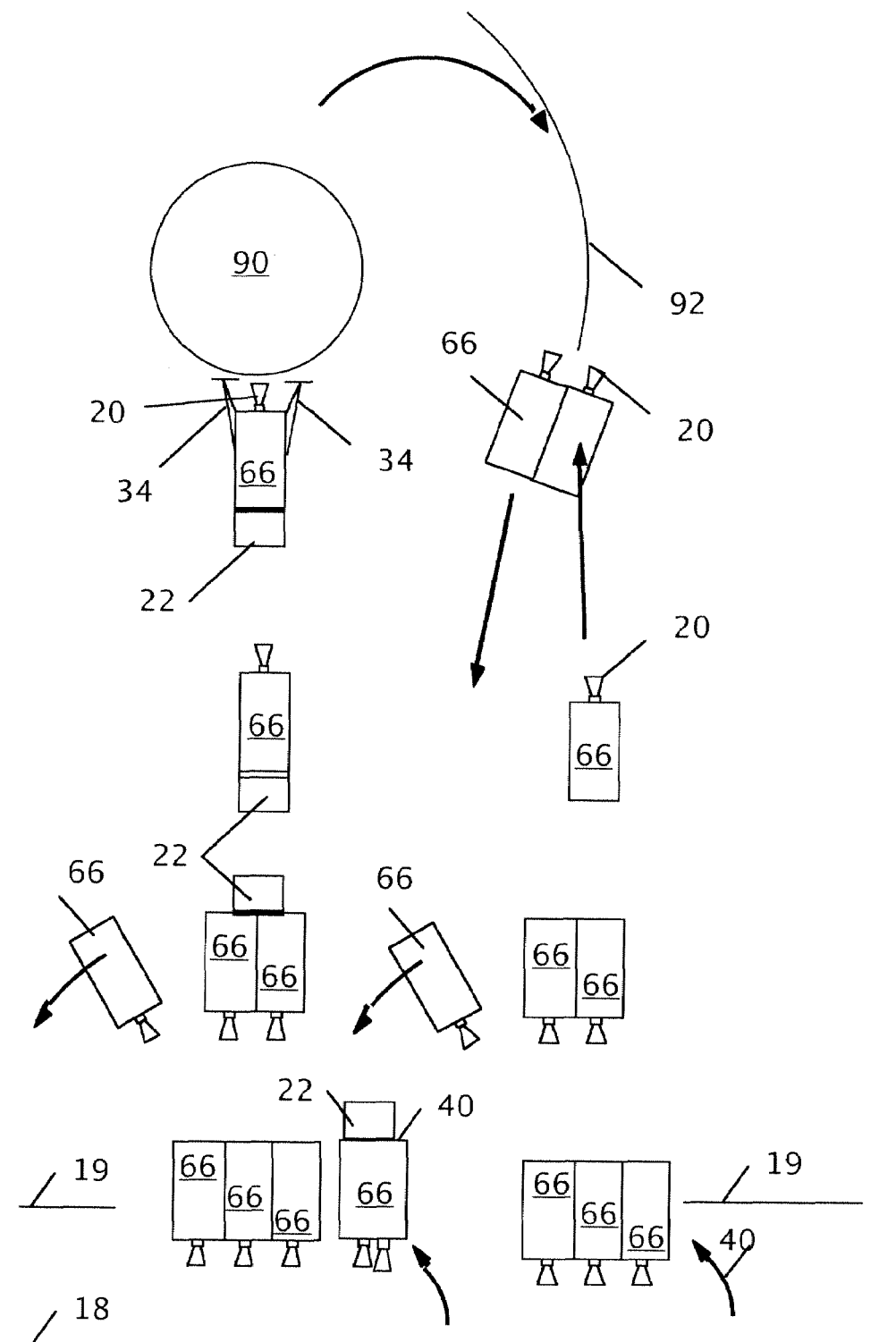
FIG. 5 shows coupled rocket units traveling to and from the lunar surface, according to an embodiment of the present invention.

Reference is made to FIG. 5 showing three coupled rocket units 66 and payload 22 leaving from low Earth orbit 18 towards the moon 90. A second rocket 66 or any other vehicle launches from Earth 18 to low Earth orbit 19 with payload pallet 40 with payload 22 and berths with earlier missions in low Earth orbit 19. At the appropriate time, near lunar orbit 92, one of the rocket units 66 detaches from the stack and with legs 34 lands on moon 90 surface to unload and leave payload 22 and pallet 40. Shown in FIG. 5, a second series of rocket unit 66 also launches at a later time for the moon with propellant for the return trip. The first rocket unit 66 departs moon 90 surface. Subsequently, the second rocket unit 66 seeks and refuels the rocket unit 66 in lunar orbit 92, at which point it can rendezvous with another unit 66 to provide enough fuel for all rendezvous units 66 to travel to another location. The unit 66 loaded with propellant at the rendezvous could have been part of a trio of coupled rocket units 66, as shown in the lower right of FIG. 5.

Figure 6A:
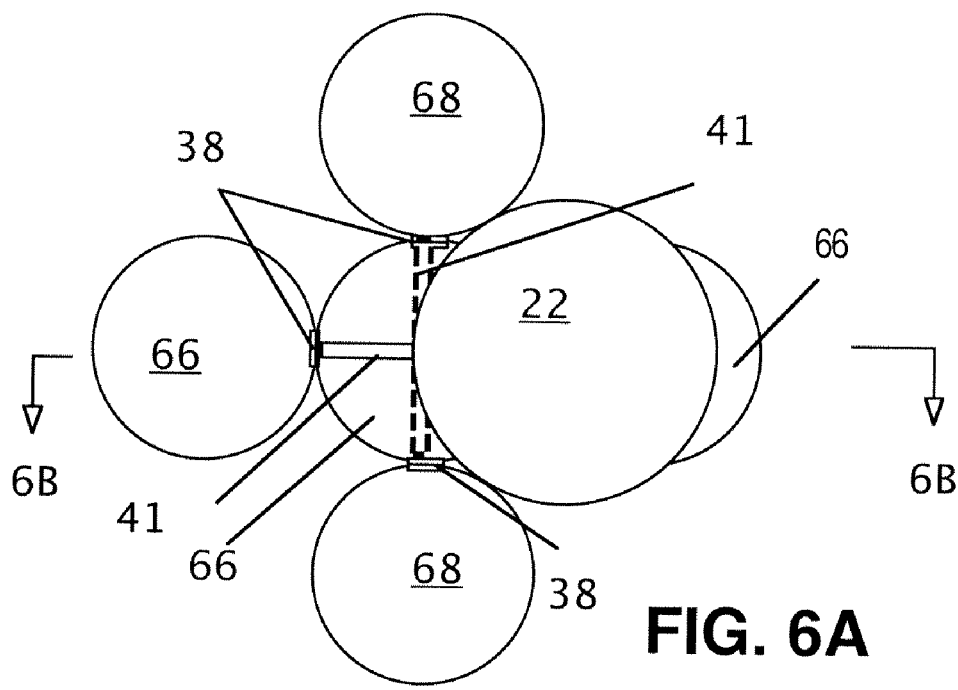
FIGS. 6A and 6B are a top view and an end view of five coupled "all in one" stage rocket units with payload, according to an aspect of the present invention.

Reference is made to FIG. 6A showing a top view of five coupled "all in one" units, including a central rocket unit 66 and four peripheral propellant units 68 and rocket units 66. Although the peripheral units are shown as two propellant units 68, and two rocket units 66, any combination of different types of units could also be used. As with the other cooperating vehicles discussed with reference to FIGS. 3-5, the cooperating units of FIG. 6 have the ability to operate in unison and/or transfer propellant from propellant units 68 via vehicle connectors 38. Payload movement along embedded beam 41 moves the vehicle center of gravity 47 (not shown) in two directions 90 degrees apart. Vehicle connector 38 attaches and detaches as required for the mission and combined vehicle mass. One or all units could have the embedded beam 41.

Figure 6B:
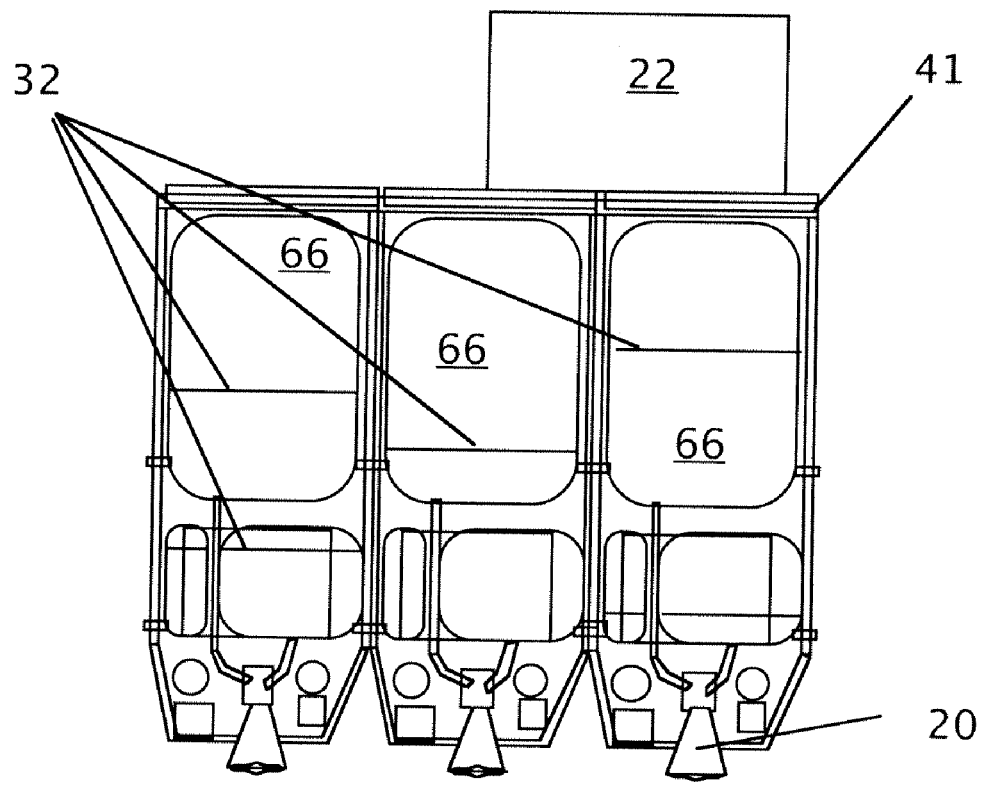

FIG. 6A shows two embedded beams 41 (which operate with two payload pallets 40 (not shown)) coupled at 90 degrees with respect to each other. Both beams 41 are provided over the center unit 66. This double combination at 90 degrees apart enables adjustments in a two dimensional plane rather than just one plane and allows multiple "all in one" stage propellant units 68 to feed one rocket engine 20. For the long distances between Earth orbit and Lunar orbit this may become helpful and cost effective. The two embedded beams also provide the ability to effectively manage larger and heavier payloads 22. FIG. 6B shows section side view of the units shown in FIG. 6A along line 6B-6B. A different type of rocket unit 66, described below, is depicted. Payload 22 is used to balance the rocket engine 20 vector through the overall vehicle center of gravity 47 as the mass on board changes.

Changes in vehicle configuration are accomplished through vehicle connectors 38 tying structurally various basic frames 26 and varying propellant levels 32 and cryogenic liquid couplings 24 in addition to the changing mass properties and centers of gravity. Downcomer line 37 is used as a method of accommodating various vehicle configuration as required.

Figures 7A, 7B:
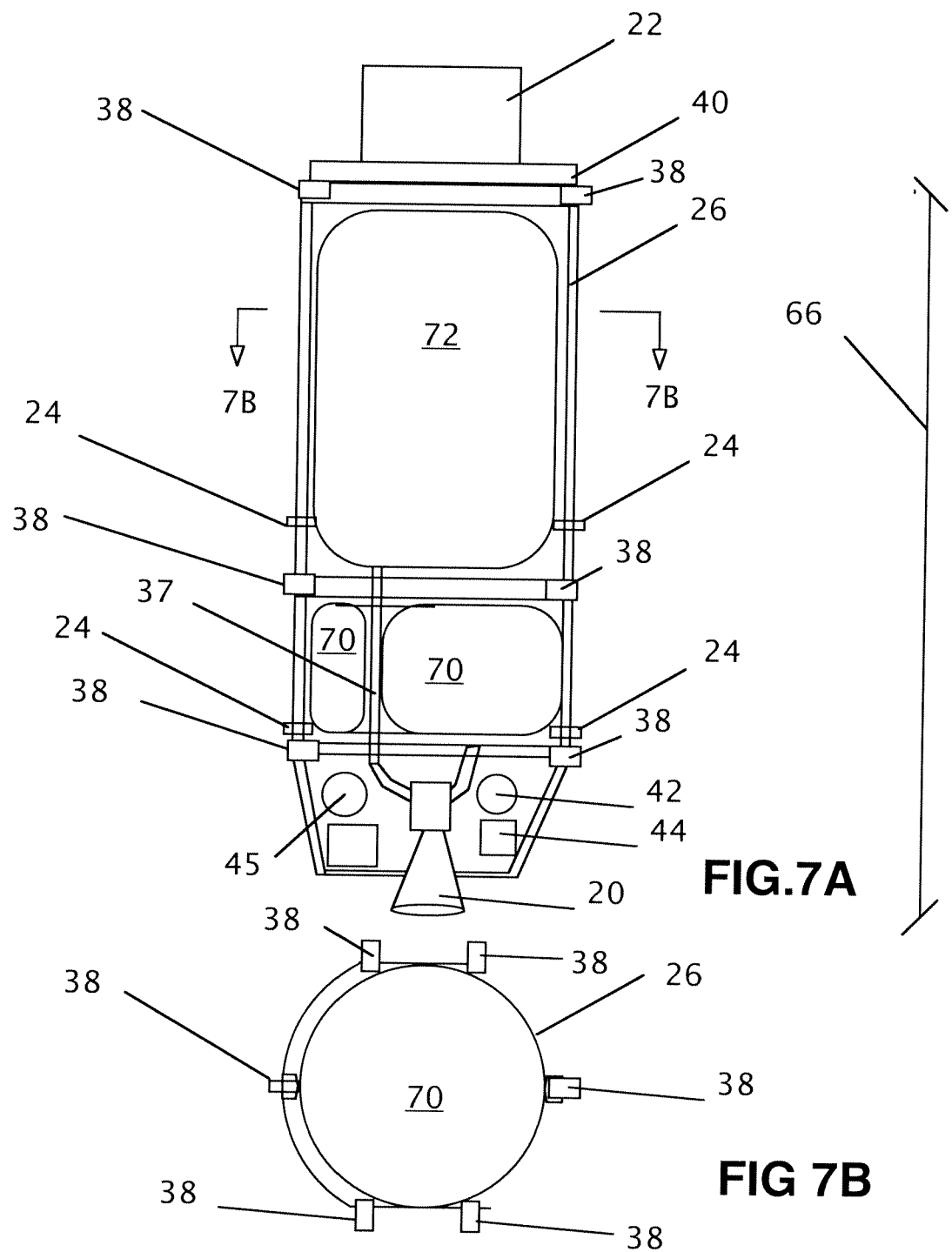
FIGS. 7A and 7B are side and end views of an "all in one" rocket unit with payload, according to an aspect of the present invention.

FIG. 7A shows another embodiment of a rocket unit 66. In this embodiment, rocket engine 20 is located below liquid oxygen tanks 70, as are propellant pressurant tank 42, vehicle subsystems 44, and gaseous RCS thruster propellant storage 45. Larger liquid oxygen tank 70 is penetrated by downcomer line 37 at the center of larger liquid oxygen tank 70 or at a non-central location (as shown). In addition, vehicle connectors 38 are provided at multiple locations, some separate from the liquid couplings 24.

As seen best in FIG. 7B, a section view along line 7B-7B, vehicle connectors 38 provide six different locations to connect to other connectors. Also, flat sections on the basic frame 26 are shown. The flat sections facilitate berthing with other frames 26 having flat sections.

Reference is now made to FIGS. 8A, 8B, and 8C, which show another embodiment, including a "slip through" frame 26. The slip through frame 26 has two side braces 54 between flat plates of basic frame 26. The structural members 54 support payload 22. Slip in liquid oxygen tank 71 and slip in liquid hydrogen tank 73 "slip between" structural members 54 to become seated at the centerline to supply cryogenic propellants through an uncomplicated anti-vortex device 52 using a flat valve 36 at the bottom of the tanks 71, 73. Propellant can be supplied either through a puncture plate or through a double flat valve 36, as described with reference to FIG. 1.

Reaction control thrusters and other vehicle subsystems 44 are placed in a volume under the slip in liquid oxygen tank 71 rather than between the plates as shown in FIG. 2. This placement allows room for the recovery of gaseous oxygen and hydrogen so it can be used to supply reaction control thrusters using gaseous oxygen and hydrogen thrusters.

FIG. 8B is a section view through line 8B-8B showing two berthing plates (or flat sections) 82 on each basic frame 26 that facilitate berthing. Connection is made with vehicle connector 38 (not shown) after the berthing edges 82 are used to bring the in-space components together in Earth orbit or beyond.

FIG. 8C is a top view showing slip in tank 71 moving from a delivery vehicle (lower 26) (shown as basic frame 26, but likely a different delivery vehicle from the EELV class of ETO vehicles due to large mass required) to a receiving vehicle (upper 26') using techniques of rendezvous and berthing. The full slip in liquid oxygen tank 71 will displace an empty slip in liquid oxygen tank (not shown) by moving (from bottom to top in the figure) of each basic frame unit 26. Flat valve 36 on end of propellant feed line 50 moves vertically to engage and seal with flat valve 36 on slip in liquid oxygen tank 71 to start propellant flow.

Because only two tanks are transferred, rather than six smaller tanks, the transfer operation is completed relatively quickly. In one embodiment, the delivery vehicle 26 transfers the full tank 71 into the receiving vehicle 26' and then moves to the other side of the receiving vehicle 26' to pick up the empty tank. Because the surfaces between the berthing edges 82 are round, the delivery vehicle can rotate to the other side using minimal energy, e.g., magnetic force.

Figure 9A:
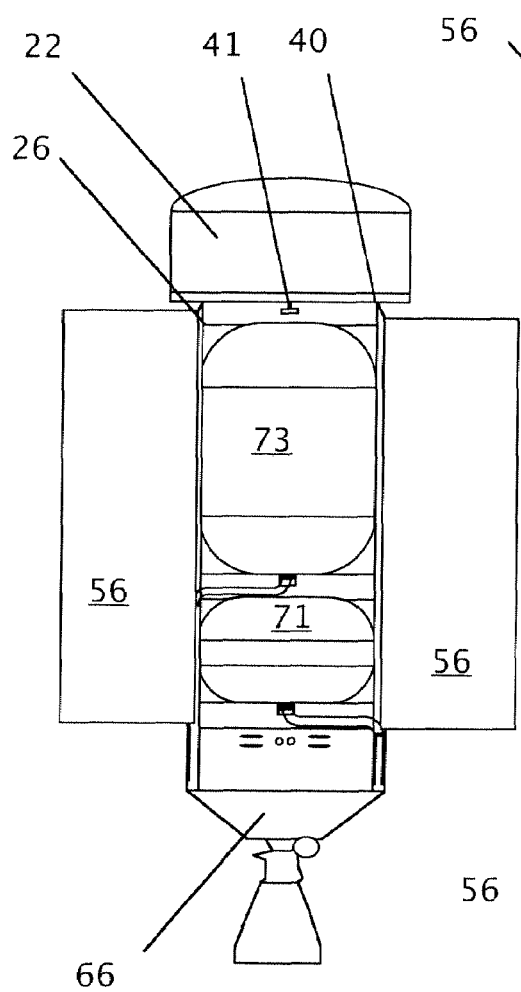
FIGS. 9A, 9B, and 9C are side and end views showing sun shade operations, according to an aspect of the present invention.
Figure 9B:
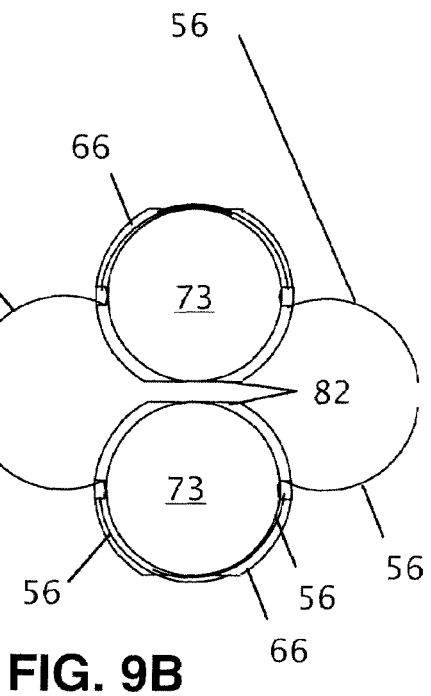
Figure 9C:
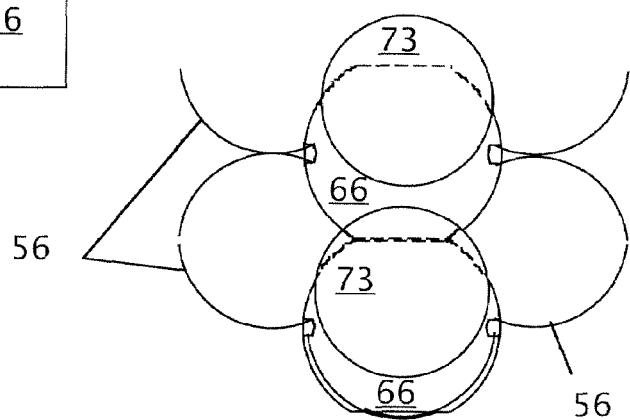

Reference is made to FIGS. 9A, 9B, and 9C depicting sun shade operational concepts for the "slip through" unit 66. Sunshades 56 move as required for transfer of tanks 71, 73. Berthing edge 82 provides an interface location for tank transfer. Shown is payload pallet 40, and payload 22 with embedded beam 41 fitting within basic frame 26 and aligned between two different units 66 to permit transfer of payload 22, as well as transfer of slip-in liquid oxygen tank 71 and slip-in liquid hydrogen tank 73 as two units 66 are berthed for tank transfer.

FIG. 9B depicts four open sun shades 56 and four closed sun shades 56. The top two and bottom two sun shades 56 are closed. The four intermediate sun shades 56 are open. The two units are nearly docked together. Slip-in liquid hydrogen tank 73 on the bottom is full and replacing empty slip-in liquid hydrogen tank 73 on the top in FIG. 9B. The four closed sun shades 56 and the four central open sun shades 56 fully protect slip in liquid oxygen tank 71 and slip in liquid hydrogen tank 73 from the full sun and/or Earth glow illumination, which would complicate the long storage life of the cryogenic propellant. When individual nearly empty slip in liquid oxygen tank 71 and slip in liquid hydrogen tank 73 are exposed to the exterior sun or Earth glow radiation, the remaining liquid cryogens are converted into gaseous cryogens for use elsewhere in rocket unit's subsystems, e.g., RCS thrusters.

FIG. 9C depicts transfer of tanks while operating the sun shades 56. Once the transfer of tanks is started, the bottom two sunshades 56 remain closed, while the central four sun shades are opened to protect the lower tank 73, which is full and the pair of rocket units 66 are rotated to minimize sun and Earth glow radiation on full tanks. Such a configuration ensures shade is maximized and sun radiation is minimized on the full tank walls. In FIG. 9C the upper tank 73 is empty and in the process of being replaced by the lower tank 73. Thus, the upper two sun shades 56 are opened to permit the empty tank 73 to be ejected. As during transfers without sun shade 56 protection in the closed position, flat valve 36 on slip in liquid hydrogen tank 73 is moved away from the flat valve 36 embedded in the rocket unit 66. After the transfer, to close the sunshades, the vehicles 66 separate slightly and empty slip-in liquid hydrogen tank 73 is recovered for reuse.

Reference is made to FIGS. 10A, 10B, 10C, and 10D showing an alternate embodiment of a propellant unit 68. In this embodiment, three side braces 54 are provided so that slip-in liquid oxygen tank 71 can slip into (but not through) the frame 26. Such a propellant unit 68 can be used to transport the tanks in the Earth to orbit vehicle. A second use in space, such as contributing to the structural aspects of a propellant depot or other in-space structure is contemplated for the propellant unit 68 by reusing basic frame 26 and side brace 54 between pallets 40. This propellant unit 68 includes a single berthing edge 82 for interfacing to a variety of vehicles in space for a variety of reasons.

FIG. 10B depicts a top view of basic frame 26 using side brace 54 between plates to transport and support slip in liquid oxygen tank 71 to space through the most difficult portion and greatest design stress of the tank's design life. Launch stabilization cradle 69 is not shown, but supports slip in liquid oxygen tank 71 in several possible ways through the launch from Earth.

FIG. 10C depicts a top view with slip in liquid hydrogen tank 73 slipping from basic frame 26 toward a second basic frame 26 requiring propellant. The transfer of tank mass is accomplished by a number of methods.

FIG. 10D is a perspective view of propellant unit 68 comprising basic frame 26 with side braces 54 between plates, but without slip in liquid hydrogen tank 73 or slip in liquid oxygen tank 71 for clarification. In one embodiment, basic frame 26 contains the required subsystems and RCS thrusters for the finding, rendezvousing, berthing and transport to a second use application in space. Rendezvous/berthing edge surface 82 includes alignment pins/holes 58 at one or two locations rather than six, as described in U.S. Pat. No. 7,156,348 to KISTLER et al., issued on Jan. 2, 2007, the disclosure of which is expressly incorporated by reference herein in its entirety.

Figure 11A:
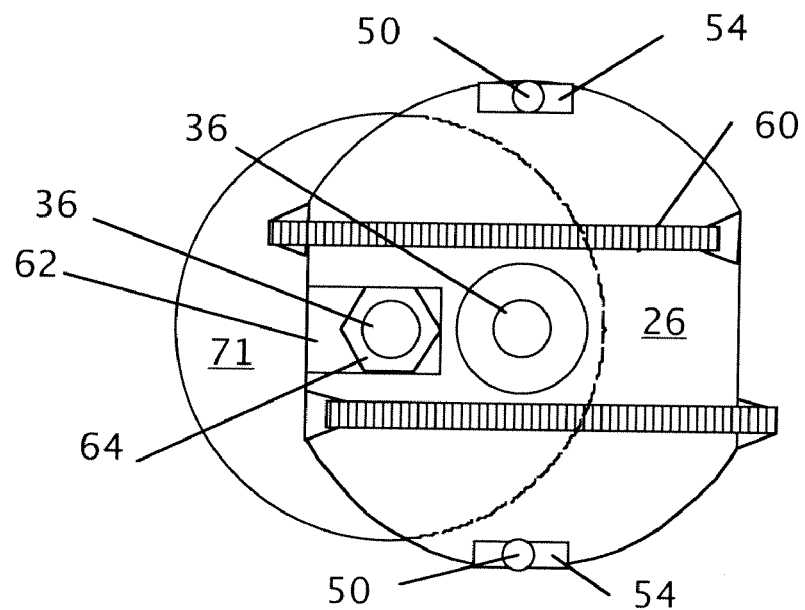
FIGS. 11A and 11B show belt transfer operations, according to an aspect of the present invention.
Figure 11B:
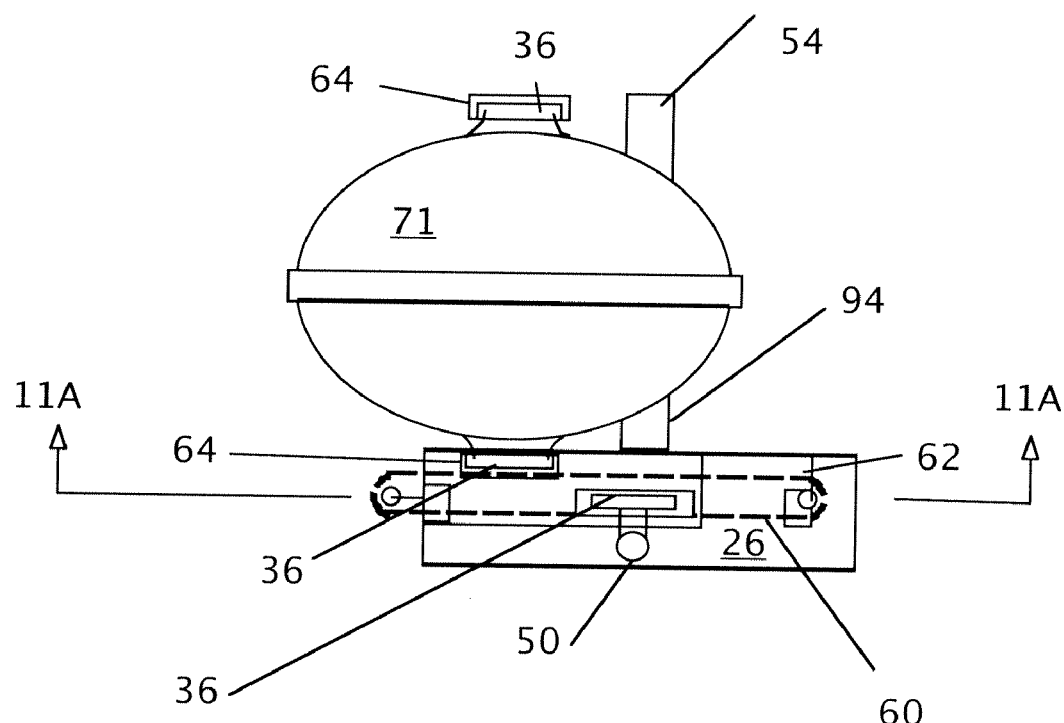

FIGS. 11A and 11B are side and top views showing a "slip though" propellant tank transfer method. FIG. 11A, for example, is a top view showing slip in liquid oxygen tank 71 moving via belt transfer device 60, which lifts and moves tank mass. The belt transfer device 60 lets down the mass at the appropriate time and location to effectively re-position the tank mass in a new location of use or storage. Remotely, the tank movement operation effectiveness is enhanced by in-space alignment devices, sensors, video cameras, and other methods to command and control the movement from Earth. Other transfer methods are depicted in U.S. Pat. No. 7,156, 348 issued on Jan. 2, 2007. the disclosure of which is expressly incorporated by reference herein in its entirety. Because most transfers will be in-space and may not have acceleration to induce a tight friction connection between belt transfer device 60 and the tank 71, a belt transfer device 60 is provided to contact both the top and bottom of the tank 71 for redundancy and to ensure the transfer is accomplished. Although not numbered, each belt transfer device 60 has a projection that can engage with a recess of another belt transfer device 60. As discussed in more detail below, a slide block 64 and transfer slot 62 can facilitate transfer and coordination of flat valves 36. For example, flat valve 36 within frame 26 is aligned with flat valve 36 in transfer slot 62 within slide block 64 for the transfer of propellant and/or propellant pressurant tank 42 gases to force propellant from the top down to the outlet.

Figure 12A:
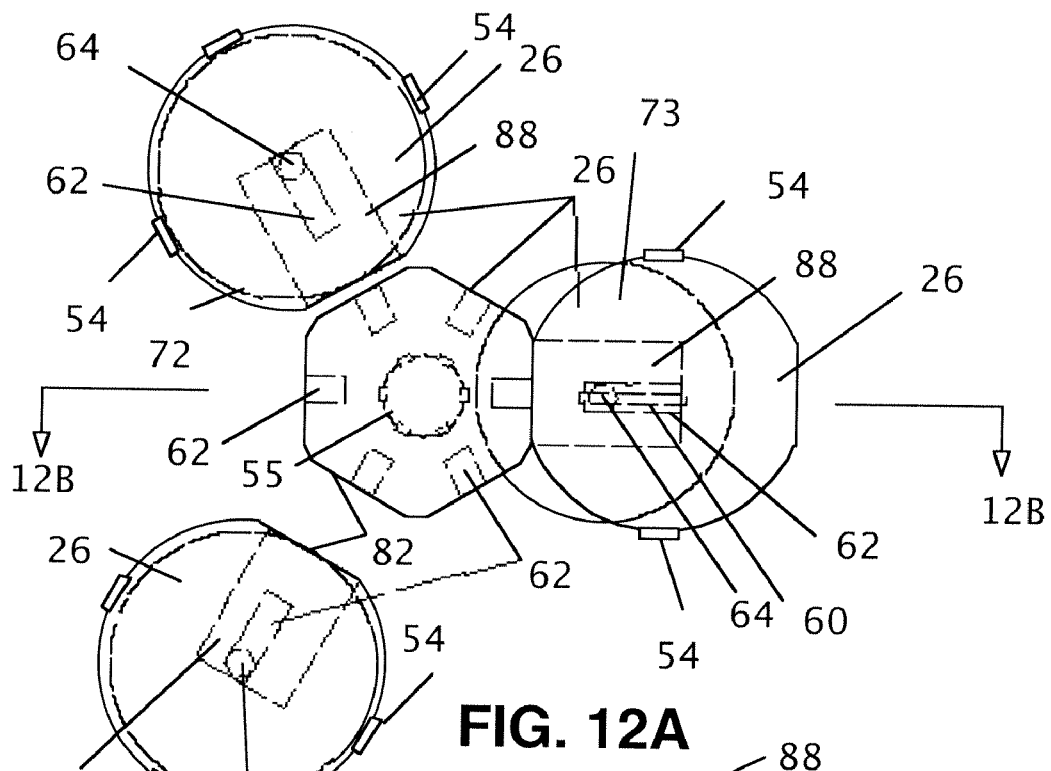
FIGS. 12A and 12B show side and end views of a small tank frame adapted for use with larger tanks, according to an aspect of the present invention.
Figure 12B:
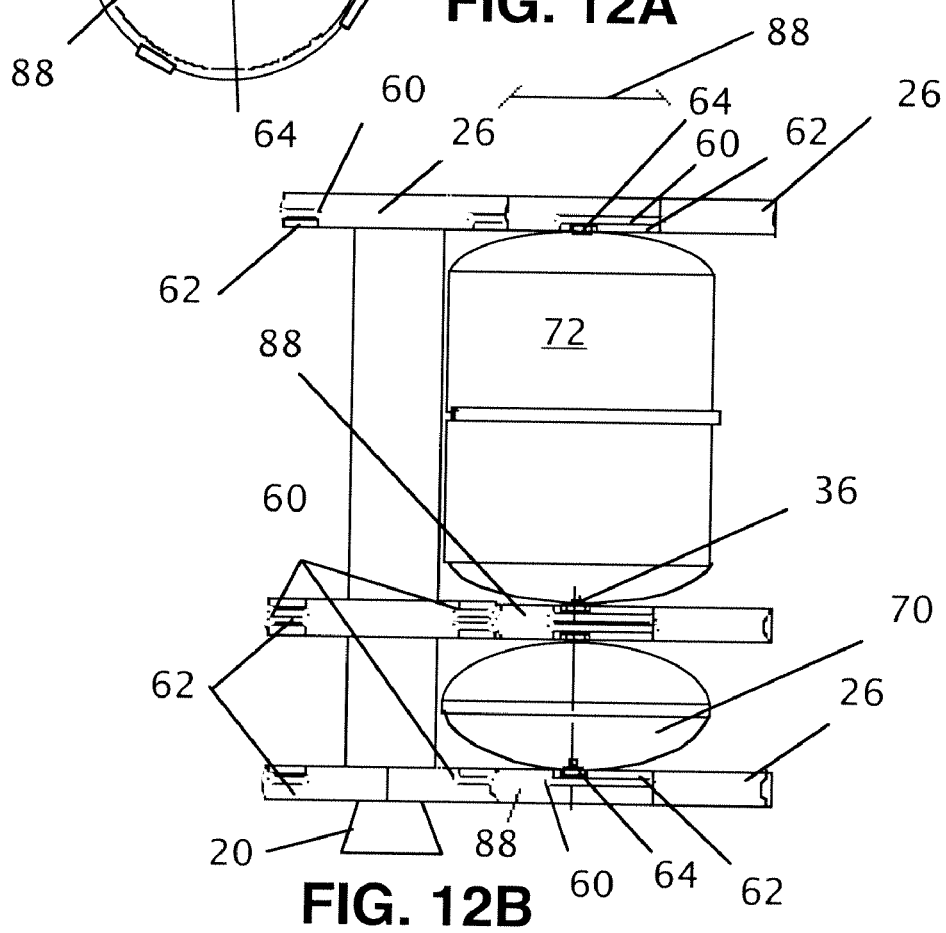

Reference is now made to FIGS. 12A and 12B, which are side and end views of the larger "slip in" tanks 70, 72 used in combination with the initial hexagon shaped small tank frame 26. Replacing six sets of smaller propellant tanks with three sets of large tanks 70, 71, 72, 73 increases propellant volume by 13 times and the concepts work with slip in and slip thru versions. The "slip-in/through" frames 26 can have a single berthing edge 82, as seen in FIG. 8C and FIGS. 12A and 12B, or two berthing edges 82, as seen in FIG. 8B. Basic frame for small tanks 26 with central brace 55 can be attached at three locations to the slip in/slip through basic frame 26 having side braces 54.

In this embodiment, a single commercial vehicle for the ETO delivery can be used to deliver the original small tank vehicle loaded with small tanks to later deliver larger resupply propellant tanks. Both the initial delivery and the resupply missions use the same payload delivery diameter.

A slide block 64 can be used as a alignment method for robotic transfer. In this embodiment, the slide blocks 64 are attached to a top and bottom of each tank. The slide blocks 64 could include a valve 36 that permits liquid to flow in and out of the tank. In another embodiment, the tanks connect to valves 36 in the central brace 55 and liquid flows through the central brace 55. In one embodiment, the slide block 64 may be one or more of several fluorinated polymers trademarked under the name TEFLON. Other non-TEFLON slide block 64 solutions are also possible.

In FIG. 12A the basic frame for small tanks 26 is berthed with the aid of rendezvous/berthing edge surface 82. Detachable support 88 of the frame 26 for large tanks 26 can attach to transfer slot 62 of the small tank frame 26. Slip in tank 72 is slid into position to use the same flat valve 36 and outflow interface as the smaller liquid oxygen tank 28. Belt transfer devices 60 can be employed to facilitate the transfer.

Reference is made to FIG. 12A, which depicts large tanks on a basic frame designed for the smaller tank diameters. The detachable tank support 88 attached between two of these smaller tank frames 26 (only one of which is fully shown in the FIG. 12B). The full impact is complete conversion to larger tanks with a gain in propellant volume of approximately 13 times.

Figure 13A:
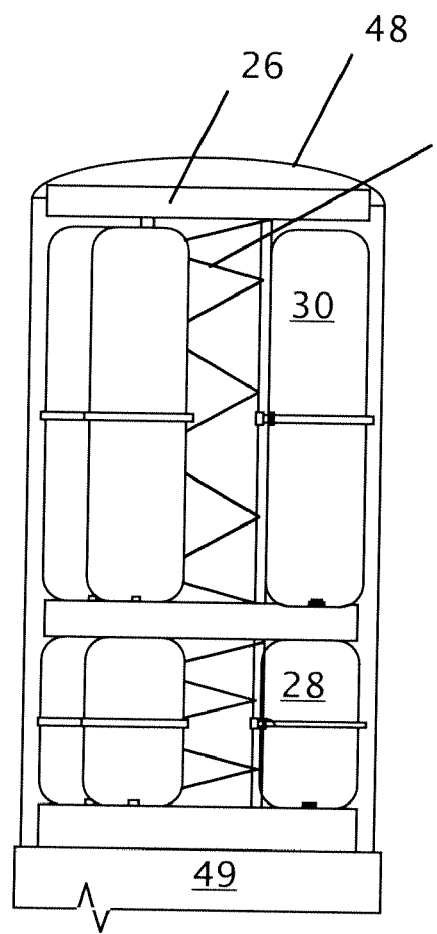
FIGS. 13A and 13B are side views showing a collapsible brace for a small tank frame, according to an aspect of the present invention.
Figure 13B:
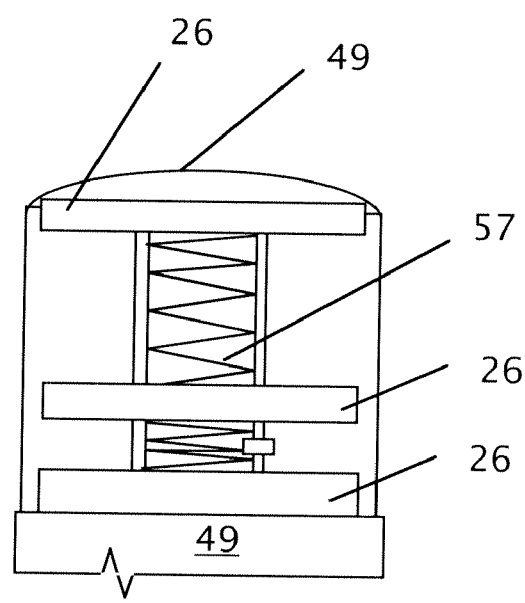

Reference is now made to FIGS. 13A and 13B, which illustrate a preferred embodiment of the smaller diameter tanks 28, 30 delivering propellant on a propellant unit 68 having a special reusable collapsible frame 26. The special reusable collapsible frame 26 collapses for re-entry and reuse to make full use of the ETO delivery vehicle payload envelope 48 and a re-entry vehicle payload envelope 51. Collapsible central brace 57 between basic frame plates holds basic frame 26 apart and stable under payload launch and later during in-space use of basic frame 26. When added to a reentry vehicle 48, the central brace 57 reduces in height by collapsing. In one embodiment, the ETO delivery vehicle 49 contains a bolt on payload compartment specially designed for propellant resupply missions.

Figures 14A, 14B:
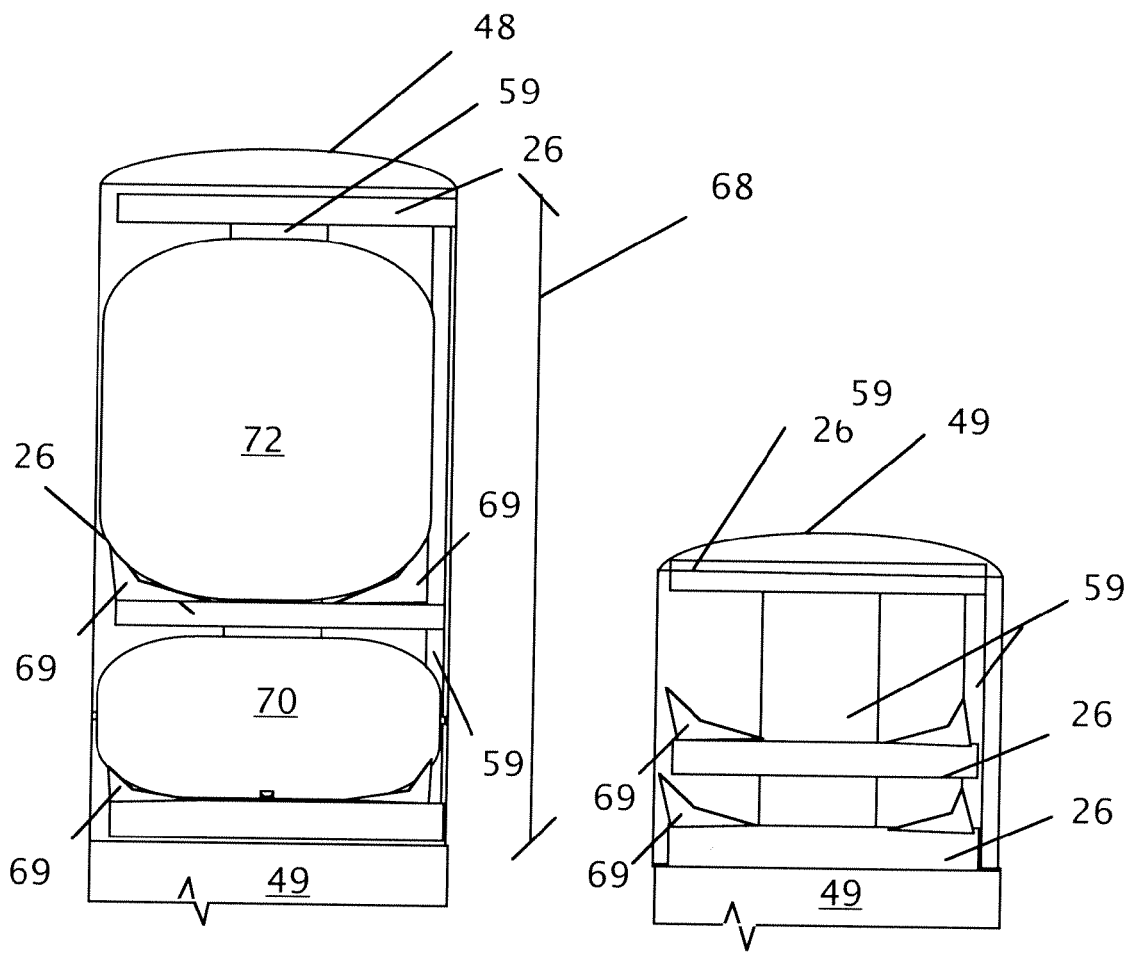
FIGS. 14A, 14B are side views showing a collapsible brace for a large tank frame, according to an aspect of the present invention.

Reference is now made to FIGS. 14A and 14B, which illustrate a preferred embodiment of the larger diameter tanks delivering propellant on a propellant unit 68 having a special reusable collapsible frame 26. The special reusable collapsible frame 26 collapses for re-entry and reuse to make full use of the ETO delivery vehicle payload envelope 48 and the re-entry vehicle payload envelope 51. Collapsible side brace 59 between basic frame plates holds basic frame 26 apart and stable under payload launch and later during in-space use of basic frame 26. When added to a reentry vehicle, the collapsible side brace 59 reduces in height by collapsing. In one embodiment, the ETO delivery vehicle 49 contains a bolt on payload compartment specially designed for propellant resupply missions.

Both FIGS. 14A and 14B depict launch stabilization cradles 69 to decrease the mass of tanks by supporting the tanks throughout the ETO delivery vehicle payload envelope 48. Launch stabilization cradle 69 can be a permanent bolt-on payload envelope cradle that reduces the mass of the tanks by supporting them in the 3 or more gravity launch environment and allows them to be designed for the future space only loads, which are significantly less mass.

Figure 15A:
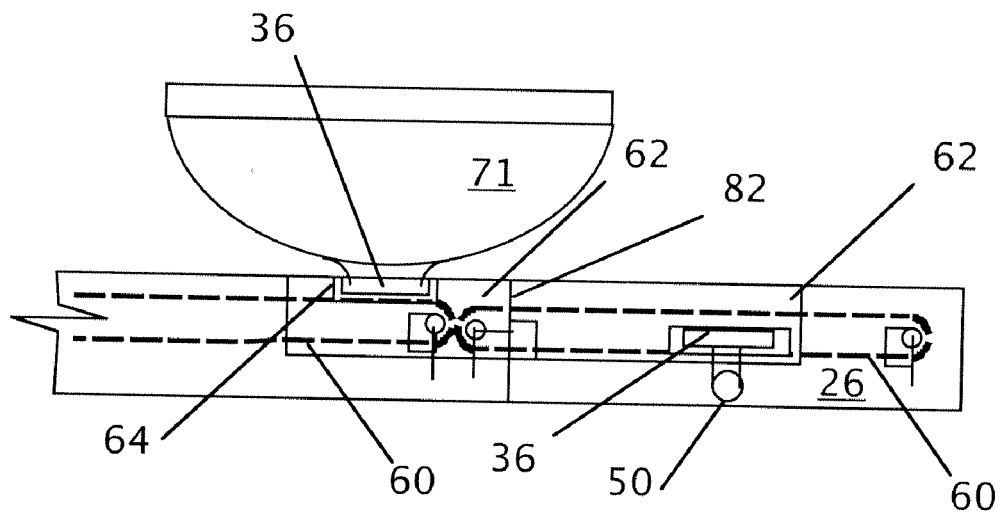
Figure 15B:
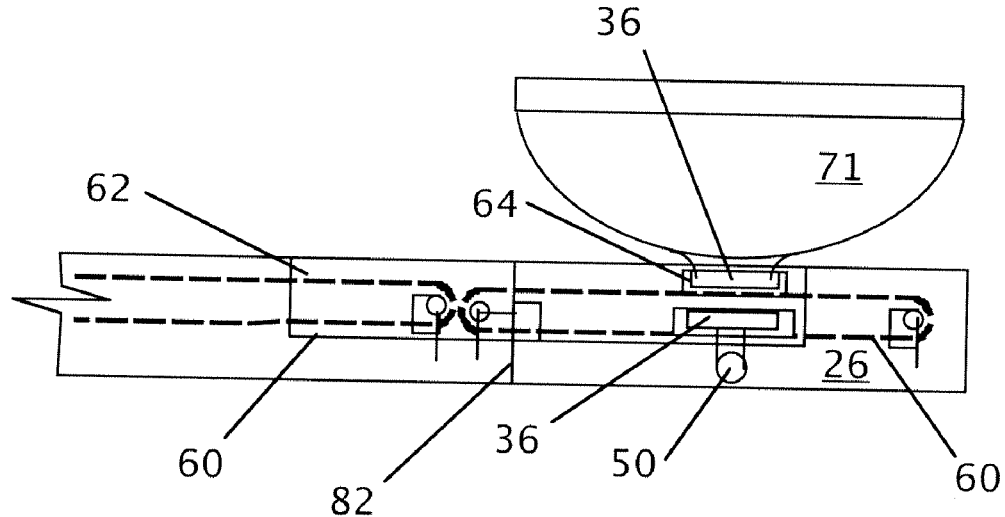
Figure 15C:
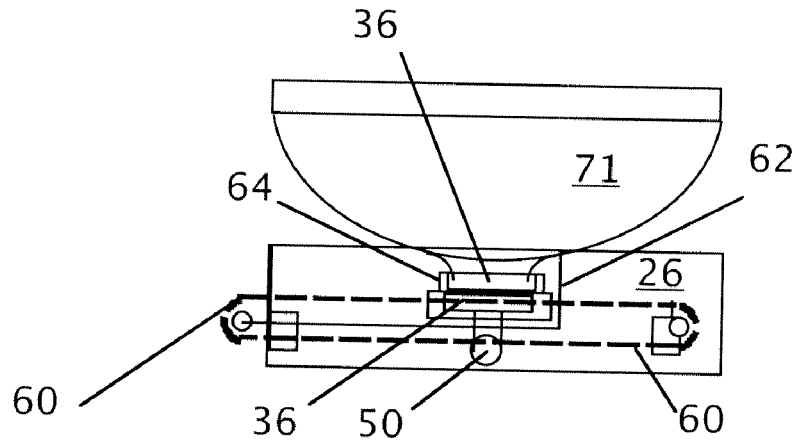

FIGS. 15A, 15B, and 15C show a flat valve 36 of a slide block 64 engaging with a flat valve 36 using conveyor or belt transfer devices 60 movement up and down within basic frame 26 in more detail. Belt transfer devices 60 are raised and lowered remotely to enable flat valve 36 coupling. More specifically, the belt transfer device 60 transfers a tank 71 (with the slide block 64 sliding within the transfer slot 62) until the flat valve 32 of the tank 71 is above a flat valve 36 of the frame. The frame's flat valve 36 is connected to a propellant feed line 50. Belt transfer device 60 then lowers so that the two flat valves 36 engage to permit sealing and transfer of propellant, as well as recirculating super cooled propellant on the launch pad. Multiple layer insulation can be used to surround the tank and minimize boil off. Miniature-coolers powered by solar arrays can help control and preserve the useful life of the cryogenic propellants.

In FIG. 15A, slip in liquid oxygen tank 71 with slide block 64 in transfer slot 62 moves on belt transfer device 60 from ETO delivery vehicle 49 (not shown) across rendezvous/berthing edge surface 82 to basic frame 26 in FIG. 15B where it stops and is aligned with flat valve 36 within basic frame 26. In FIG. 15C belt transfer device 60 then lowers flat valve and slide block 64 down to align and seal with flat valve 36 and propellant line 50.

Figure 16A:
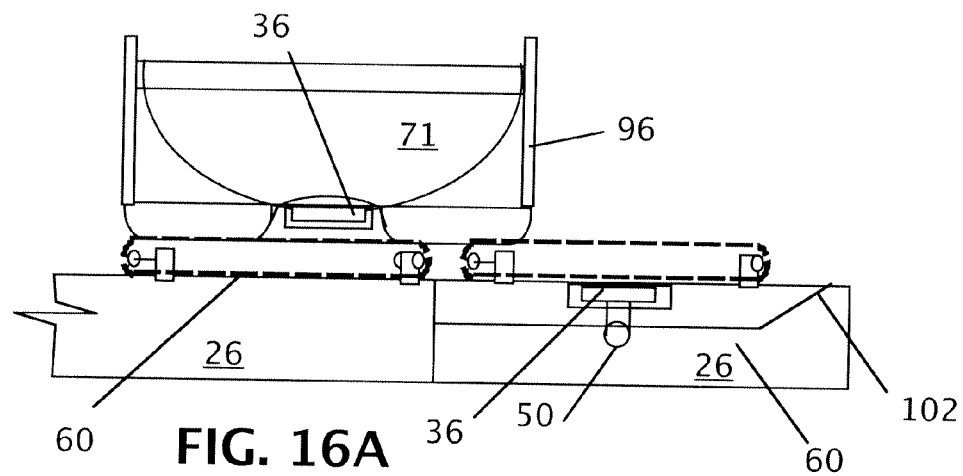
FIGS. 16A, 16B and 16C are side views showing details of an alternate embodiment of the slide block and belt transfer device operations, according to an aspect of the present invention.
Figure 16B:
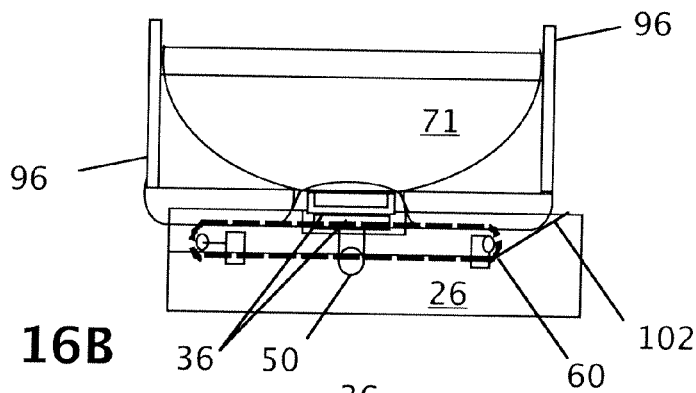
Figure 16C:
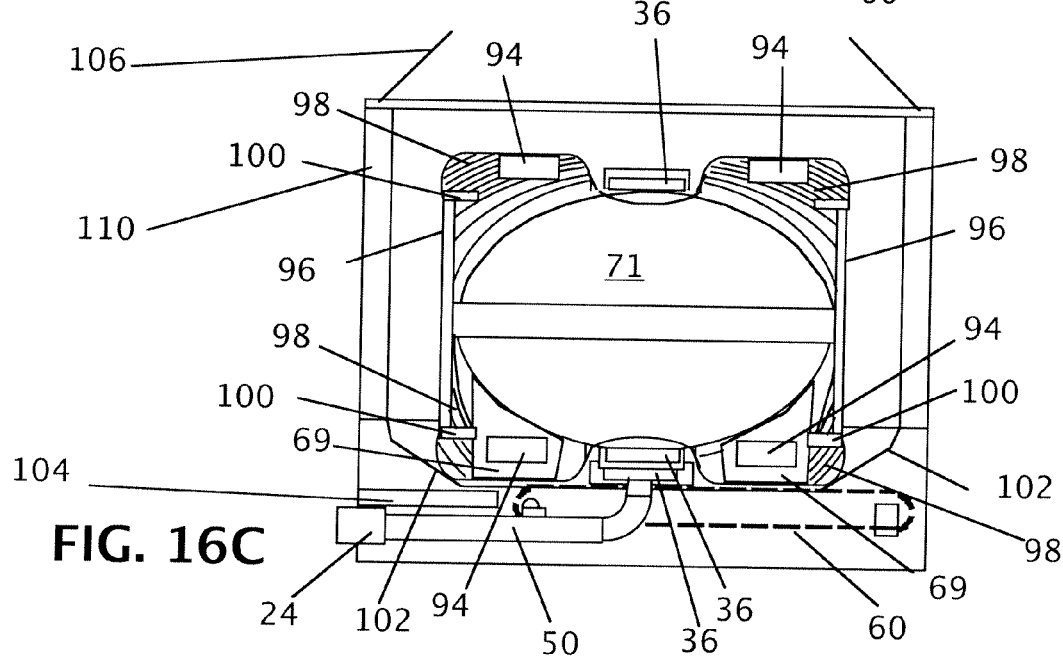

With reference to FIGS. 16A-C, different slip in oxygen tank 71 has only flat valve 36 top and bottom with no slide block 64 or guide slots 62. In FIG. 16A, slip in oxygen tank 71 (bottom half of tank shown) has embedded flat valve 36 with metal below it to protect it and allow belt transfer device 60 to maneuver slip in oxygen tank 71 to align the tank for joining with flat valve 36 in basic frame 26.

In FIG. 16B, flat valve 36 of slip in oxygen tank 71 (bottom half of tank shown) engaged with a flat valve 36 using conveyor or belt transfer devices 60 movement up and down within basic frame 26. Belt transfer devices 60 are raised and lowered remotely to enable flat valve 36 coupling. More specifically, the belt transfer device 60 transfers a tank 71 until the flat valve 32 of the tank 71 is above a flat valve 36 of the frame. The frame's flat valve 36 is connected to a propellant feed line 50. Belt transfer device 60 then lowers so that the two flat valves 36 engage to permit sealing and transfer of propellant, as well as recirculating super cooled propellant on the launch pad. An alignment seat 102 helps align the tank to ensure proper engagement. Multiple layer insulation 98 (FIG. 16C) can be used to surround the tank and minimize boil off. Miniature-coolers 94 (FIG. 16C) powered by solar arrays 96 can help control and preserve the useful life of the cryogenic propellants.

In FIG. 16C, slip in liquid oxygen tank 71 (full tank shown) in Earth shipping container 110 for use in gravity, moves on belt transfer device 60 from Earth shipping container 110 to ETO delivery vehicle 49 (not shown) where it stops and is aligned with flat valve 36 within basic frame 26. Belt transfer device 60 also works in different gravity environments, but top belt transfer device 60 and pressurant line omitted on top of the tank in FIG. 16C, because Earth gravity is sufficient to provide traction for tank movement. In FIG. 16C belt transfer device 60 then lowers flat valve down to align with basic frame 26 on ETO delivery vehicle 49 (not shown) and seal with flat valve 36 and propellant line 50. Reusable Earth shipping container 110 contains crane lift provisions 106 and fork lift handling provisions 104, in addition the ability to open side door in Earth shipping container 110 and control all elements within Earth shipping container 110 including direct loading of tanks on the launch pad, if necessary. Slip in liquid oxygen tank 71 contains multi layer insulation 98 next to tank, solar cells 96 for limited power in space, for operation of mini coolers 94 via plug/play wireless communication and control 100 interfaces. Slip in liquid oxygen tank 71 can be supported by launch stabilization cradle 69. In this embodiment, the belt 60 is part of the bottom of the container 110. Cryogenic liquid coupling 24 and propellant feed line 50 can be used for filling and emptying slip in liquid oxygen tank 71, while in Earth shipping container 110. Alignment seat 102 in the bottom of Earth shipping container 110 assists the alignment of the tanks over the flat valve 36 and allows the in Earth shipping container 110 to assist in the test, filling, top off and checkout of the tanks.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. An aerospace vehicle that accommodates removable propellant tanks for facilitating propellant operations in space, comprising:
   a frame having thrusters mounted thereon;
   at least two plates for supporting the removable propellant tanks;
   at least one brace supporting the plates;
   a cavity between two plates that accommodates the removable propellant tanks; and
   slide blocks attached to a top and bottom of the removable propellant tanks, the slide blocks sliding within a transfer slot in each of the plates to facilitate movement of the removable propellant tanks into and out of the frame.

2. The vehicle according to claim 1, in which the at least one brace comprises two side braces through which the removable propellant tank can move when being inserted into and removed from the frame.

3. The vehicle according to claim 2, in which the frame further comprises two berthing edges that enable berthing with other frames.

4. The vehicle according to claim 1, in which the at least one brace comprises three side braces between which the removable propellant tanks can sit.

5. The vehicle according to claim 4, in which the frame further comprises a berthing edge that enables berthing with other frames.

6. The vehicle according to claim 1, in which the at least one brace is collapsible.

7. The vehicle according to claim 1, further comprising a non-removable toroidal shaped tank.

8. The vehicle according to claim 7, further comprising a rocket engine that is surrounded by the non-removable toroidal shaped tank.

9. The vehicle according to claim 1, further comprising launch stabilization cradles that support the removable propellant tanks.

10. The vehicle according to claim 9, in which at least one launch stabilization cradle comprises a cryogenic propellant temperature protection system.

11. The vehicle according to claim 9, in which at least one launch stabilization cradle comprises a recirculation system that re-circulates cryogenic liquids stored in the removable propellant tanks.

12. The vehicle of claim 1, further comprising a plurality of vehicle connectors that facilitate connection with at least one of other frames and payloads, in which at least some of the connectors include cryogenic liquid couplings.

13. The vehicle of claim 1, further comprising a plurality of sun shades that protect the removable propellant tanks, the sun shades moving during tank transfer operations.

14. The vehicle of claim 1, further comprising at least one belt transfer device that enables replacement of the removable propellant tanks.

15. An aerospace vehicle that accommodates removable propellant tanks for facilitating propellant operations in space, comprising:
- a frame having thrusters mounted thereon;
- at least two plates for supporting the removable propellant tanks;
- at least one central brace supporting the plates;
- a cavity between two of said plates that accommodates the removable propellant tanks; and
- a detachable tank support that facilitates storage of larger propellant tanks, the detachable tank support connecting to the frame and including a transfer slot; and
- slide blocks attached to a top and bottom of the larger propellant tanks, the slide blocks sliding within the transfer slot to facilitate movement of the larger propellant tanks into and out of the frame.

16. The vehicle of claim 15, in which at least one of the slide blocks includes a valve that communicates with the larger tanks to enable liquid to flow into and out from the larger tanks.

* * * * *